US011428618B2

(12) United States Patent
Karnik et al.

(10) Patent No.: US 11,428,618 B2
(45) Date of Patent: Aug. 30, 2022

(54) SYSTEMS AND METHODS FOR MONITORING AIR PARTICULATE MATTER

(71) Applicant: Massachusetts Institute of Technology, Cambridge, MA (US)

(72) Inventors: Rohit Nandkumar Karnik, Cambridge, MA (US); An Chang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 331 days.

(21) Appl. No.: 16/466,786

(22) PCT Filed: Dec. 19, 2017

(86) PCT No.: PCT/US2017/067336
§ 371 (c)(1),
(2) Date: Jun. 5, 2019

(87) PCT Pub. No.: WO2018/118934
PCT Pub. Date: Jun. 28, 2018

(65) Prior Publication Data
US 2019/0346356 A1    Nov. 14, 2019

Related U.S. Application Data

(60) Provisional application No. 62/436,030, filed on Dec. 19, 2016.

(51) Int. Cl.
*G01N 15/00* (2006.01)
*G01N 15/02* (2006.01)
(Continued)

(52) U.S. Cl.
CPC ....... *G01N 15/0227* (2013.01); *G01N 1/2205* (2013.01); *G01N 1/2273* (2013.01);
(Continued)

(58) Field of Classification Search
CPC ............... G01N 1/2205; G01N 1/2273; G01N 15/0625; G01N 15/0656;
(Continued)

(56) References Cited

U.S. PATENT DOCUMENTS 5,892,141 A * 4/1999 Jones ................. G01N 5/04
73/24.03
6,055,052 A    4/2000 Lilienfeld
(Continued)

FOREIGN PATENT DOCUMENTS

CN    101171504 A    4/2008
CN    105185026 A    12/2015
(Continued)

OTHER PUBLICATIONS

Carlos Angulo Barrios and Víctor Canalejas-Tejero, "Light coupling in a Scotch tape waveguide via an integrated metal diffraction grating," Opt. Lett. 41, 301-304 (2016).*
(Continued)

*Primary Examiner* — Rebecca C Bryant
(74) *Attorney, Agent, or Firm* — Barnes & Thornburg LLP

(57) ABSTRACT

Systems and methods for monitoring air particulate matter are provided herein that capture particles from the air for analysis. Particles are captured using electrostatic and/or mechanical means to deflect particles toward a substrate. Electrostatic precipitation causes charged carriers to deflect towards a charged substrate. Filtration-based means employ filters and/or fibers to capture particles from air flowing therethrough. A sensor such as a camera is used to read the captured particles. An illumination source directs light towards the substrate, causing the particles to scatter light, which the sensor can detect and derive information or imaging therefrom, which can also be used for further
(Continued)

particle or pollution analyses. The substrate can be replenished using electrostatic techniques such as reverse electrostatic force, or mechanical means such as cleaning using a brush or replacing a tape substrate. Dynamic PM monitoring detects and makes adjustments such as those related to air volume, imaging characteristics and substrate replenishment.

19 Claims, 16 Drawing Sheets

(51) Int. Cl.
| | |
|---|---|
| *G01N 1/22* | (2006.01) |
| *G01N 1/28* | (2006.01) |
| *G01N 15/06* | (2006.01) |
| *G01N 15/14* | (2006.01) |
| *G01N 15/10* | (2006.01) |
| *G01N 21/85* | (2006.01) |

(52) U.S. Cl.
CPC ....... *G01N 1/2813* (2013.01); *G01N 15/0211* (2013.01); *G01N 15/0625* (2013.01); *G01N 15/0637* (2013.01); *G01N 15/0656* (2013.01); *G01N 15/1463* (2013.01); *G01N 2001/2833* (2013.01); *G01N 2015/0046* (2013.01); *G01N 2015/0294* (2013.01); *G01N 2015/03* (2013.01); *G01N 2015/1087* (2013.01); *G01N 2015/1093* (2013.01); *G01N 2021/8585* (2013.01)

(58) Field of Classification Search
CPC ... G01N 2001/2833; G01N 2015/0046; G01N 33/54373; G02B 6/10; G02B 2006/12138
See application file for complete search history.

(56) References Cited

U.S. PATENT DOCUMENTS

| | | | | |
|---|---|---|---|---|
| 7,006,923 | B1 | 2/2006 | Rubin | |
| 7,168,292 | B2 | 1/2007 | Gundel et al. | |
| 10,459,173 | B2* | 10/2019 | Haase | G02B 6/32 |
| 10,908,062 | B2* | 2/2021 | Manautou | G01N 15/1463 |
| 2004/0227938 | A1 | 11/2004 | Craig | |
| 2004/0232052 | A1 | 11/2004 | Call et al. | |
| 2004/0246479 | A1 | 12/2004 | Cartlidge et al. | |
| 2006/0147147 | A1* | 7/2006 | Zourob | G01N 21/648 385/12 |
| 2007/0154129 | A1* | 7/2007 | Beausoleil | G01N 21/648 385/12 |
| 2008/0105034 | A1* | 5/2008 | Parfitt | G01N 15/0255 73/28.06 |
| 2013/0315447 | A1 | 11/2013 | Sieracki et al. | |
| 2016/0290912 | A1 | 10/2016 | Kent et al. | |
| 2018/0284003 | A1 | 10/2018 | Lucas et al. | |

FOREIGN PATENT DOCUMENTS

| | | |
|---|---|---|
| JP | 2004301768 A | 10/2004 |
| JP | 2014048100 A | 3/2014 |
| WO | 2011045961 A1 | 4/2011 |
| WO | 2016/064934 A1 | 4/2016 |
| WO | 2016/073745 A2 | 5/2016 |

OTHER PUBLICATIONS

[No Author Listed] Applied Electrostatic Precipitation, Springer Science & Business Media, 2012 (537 pages).
[No Author Listed] "ISO 12103-1, A1 Ultrafine Test Dust," http://www.powdertechnologyinc.com/product/iso-12103-1-a1-ultrafine-test-dust/ (2 pages).
Amaral, S et al., "An Overview of Particulate Matter Measurement Instruments," Atmosphere, vol. 6, Issue 9, pp. 1327-1345, 2015 (19 pages).
Bardina J, "Methods for surface particle removal: a comparative study," Particles on Surfaces 1, pp. 329-338, 1988 (14 pages).
Hinds, W, "Aerosol Technology," Wiley, New York, 1982 (200 pages).
International Search Report and Written Opinion for Application No. PCT/US17/67336 dated Apr. 24, 2018 (15 pages).
Jaworek, A et al., "Modern electrostatic devices and methods for exhaust gas cleaning: A brief review," Journal of Electrostatics, vol. 65, Issue 3, pp. 133-155, 2007 (23 pages).
Kanaoka, C et al., "Stochastic simulation of the agglomerative depostion process of aerosol particles on an electret fiber," Powder Technology, vol. 118, Issues 1-2, pp. 97-106, 2001 (10 pages).
Lowe H et al.,"The physics of electrostatic precipitation," British Journal of Applied Physics, vol. 4, Supplement 2, 1953 (9 pages).
Ma, H et al., "Polymer-based optical waveguides: materials, processing, and devices," Advanced Materials, vol. 14, Issue 19, pp. 1339-1365, 2002 (27 pages).
Raaschou-Nielsen et al., "Air pollution and lung cancer incidence in 17 European cohorts: prospective analyses from the European Study of Cohorts for Air Pollution Effects (ESCAPE)," The Lancet Oncology, vol. 14, Issue 9, pp. 813-822, Aug. 2013 (10 pages).
Supplementary European Search Report for Application No. EP17884881 dated Jul. 13, 2020 (12 pages).
Chinese Office Action and Search Report for Application No. 201780086791.6, dated Aug. 25, 2021 (32 Pages).
Japanese Office Action for Application No. 2019554492, dated Oct. 26, 2021 (6 pages).
Korean Office Action for Application No. 10-2019-7020493, dated Mar. 14, 2022 (19 pages).

* cited by examiner

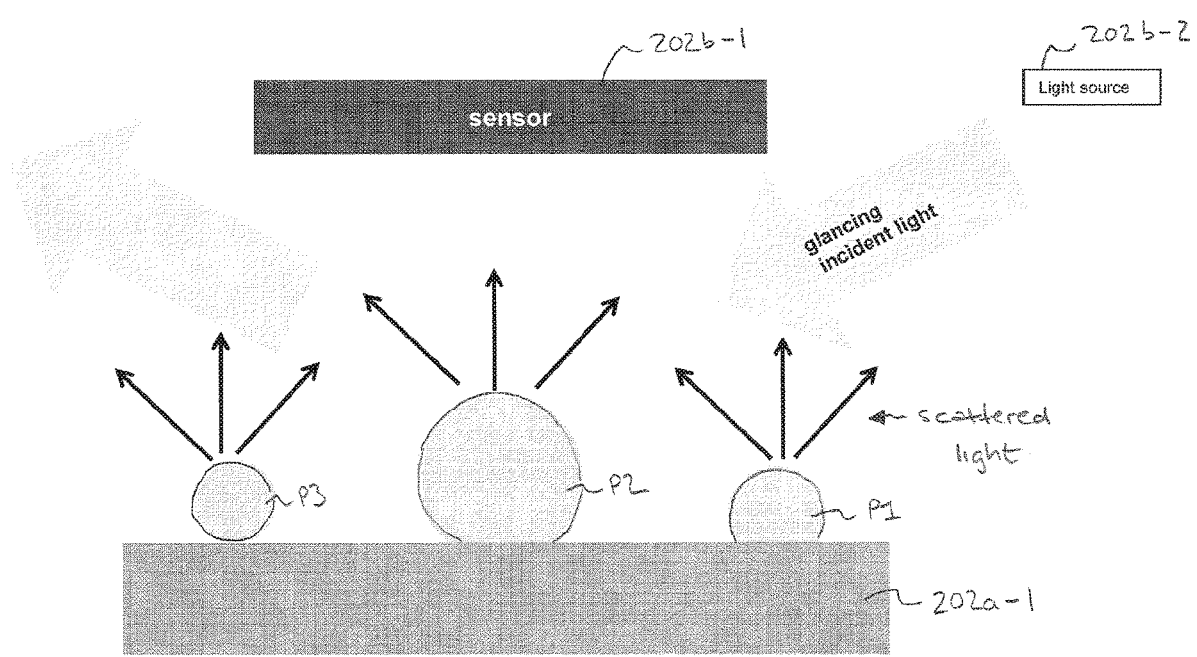

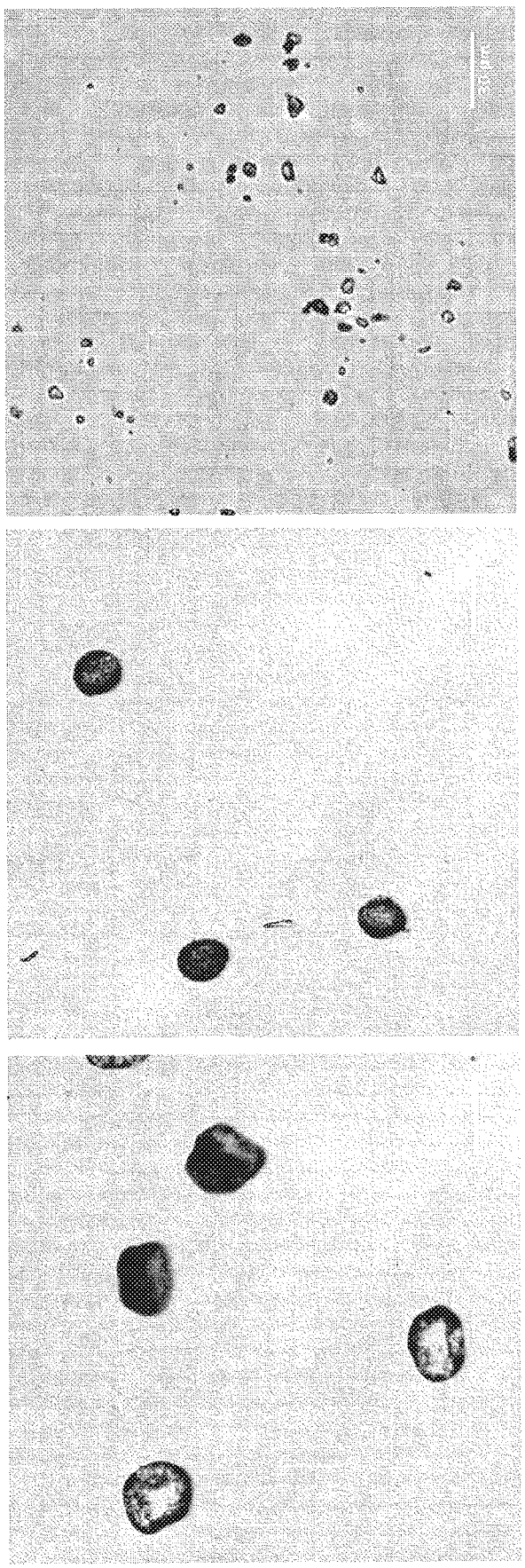

SYSTEMS AND METHODS FOR MONITORING AIR PARTICULATE MATTER

CROSS REFERENCE TO RELATED APPLICATION

The present application is a U.S. National Stage of and claims priority to International Application No. PCT/US17/67336, filed Dec. 19, 2017, and entitled "SYSTEMS AND METHODS FOR MONITORING AIR PARTICULATE MATTER," which claims priority to and the benefit of U.S. Provisional Application No. 62/436,030, filed on Dec. 19, 2016, and entitled "Low-Cost Air Particulate Monitor Based On Particle Capture And Imaging," the contents of each which is hereby incorporated by reference in their entireties.

FIELD

The present application relates to systems and methods for monitoring air particulate matter, and more specifically to capturing particles, reading the captured particles and performing analytics based on information collected from the captured particles.

BACKGROUND

Environmental health continues to be an increasingly important global issue. Air pollution, for instance, is known to have environmental effects impacting the radiation balance of the earth, cloud formation, global warming and visibility, for example. These environmental impacts of air pollution also affect human health, particularly relating to eyes, nose, throat, lung, heart and pregnancy outcomes. To mitigate the adverse effects of air pollution, many nations have enacted legislation to regulate pollutants. As a result, various entities have been required or motivated to monitor air pollution and take action as needed. To this end, entities such as manufacturers, builders and even cities, for example, have increasingly developed or deployed more environmentally friendly machinery, cars, planes, buildings, factories, infrastructure and the like, with the goal of achieving cleaner and greener environments.

The benefits of these pollution control regulations and environmentally-friendly initiatives requires monitoring air pollution and taking preventative or remedial actions as needed to mitigate its impact. Indeed, the benefits of these regulations and initiatives are directly correlated to the frequency, breadth and quality of monitoring air pollution. In other words, deploying more monitors with more frequency leads to stronger and more precise pollution knowledge and information, which can in turn lead to enhanced preventative and remedial tools and techniques.

Currently, particulate monitoring technologies exist that can collect particles using filters and measure their mass. Other particulate monitoring technologies direct laser light at particles in rapidly passing air. These existing technologies therefore are limited in the amount of information that can be obtained about the particles, for example, due to the sensing limitations of the technologies or the short amount of time during which the particles can be analyzed. Moreover, traditional particulate monitoring systems are large, expensive, and require significant amounts of power to function, making them impractical to deploy in large quantities for example, in smart cities.

Accordingly, there is a need for systems and methods that provide air particulate matter monitoring that can capture particles from air, enabling the particles, while captured, to be analyzed. There is also a need for captured particles to be able to be read by sensors such as optical or imaging sensors. Moreover, there is a need for substrates on which particles are captured to be replenished such that a cleaner or particle-free substrate can be provided for capturing particles. Moreover, there is a need for the monitoring to be dynamically adjustable to account for real-time data and to optimize sensing performance. Still further, there is a need for particulate matter monitoring to be widely, inexpensively and non-intrusively deployable.

SUMMARY

Systems and methods are described herein for monitoring particulate matter (PM), for example, in air. More specifically, PM monitoring systems and methods are described herein that can capture particles from air and, while captured, perform sensing operations thereon. Particles can be captured using one or a combination of electrostatic precipitation and mechanical captors, tools and/or techniques. As described herein, electrostatic precipitation can be accomplished by (1) charging an conductive substrate with one charge, and (2) charging particles in collected air with another charge opposite the charge of the substrate. The particles can be charged generating charge carriers with an electrode, causing the particles to charge and deflect in the direction of the oppositely charged substrate, wherein they can remain attached for analysis. Mechanical tools and techniques can also or additionally be used to capture particles. For instance, a filtration system made up of a filter or a group of fibers functioning as the substrate. The filter and/or fibers are configured to intercept particles as air flows therethrough. Air flow and the volume of air from which particles are collected can be controlled using an air pump or a similar system.

Particles collected on the substrate can then be imaged or otherwise sensed by one or more sensors. Various sensors can be used, including optical and imaging sensors such as a camera. Imaging by the sensors can be performed by directing light toward the substrate, which in turn causes the particles captured on the substrate to scatter light. The scattered light is detected by the sensor, and can be used to obtain information and/or image the captured particles. To avoid incident or reflected light to interfere with the scattered light, the light directed at the substrate by the illumination source can be provided at a glancing angle. In addition or as an alternative to the positioning of the illumination source at a glancing angle, the substrate can be configured to function as a waveguide to re. The imaging or other sensing of the particles can be used to conduct further analyses. For example, characteristics or data about the particles, such as their size, position, shape and distribution can be detected or calculated, and in turn used to derive other information such as the type or source of the particle or pollution.

The substrate on which particles are captured can be replenished by cleaning or replacing the substrate or its surface. Replenishing the substrate or its surface can be performed, for example, to provide a clean or cleaner surface onto which new particles can be captured and analyzed. Replenishing the surface can be performed using electrostatic and/or mechanical cleaners, tools and techniques. Electrostatic replenishment, for example, is accomplished by applying a reverse charge on the charged particles captured on the substrate, causing them to detach or separate from the substrate. Mechanical tools and techniques can include the use of one or more of brushes, heating and vibration to loosen or remove particles from the substrate or its surface. In some instances, tape can be dispensed and used as the substrate or surface of the substrate on which the particles are captured. Thus, to replenish the substrate or its surface, rolls of tape can be advanced to provide a new clean section of tape onto which particles can be captured.

The aspects and features of the PM monitoring described herein can be adjusted dynamically, in real-time. Dynamic adjustments ensure that the monitoring process is being executed optimally in accordance with the intended purpose and goals. To this end, information collected during runtime can be analyzed and used to determine the need or desire to adjust aspects and features such as the volume of air being collected from which particles are captured; the imaging specifications (e.g., frequency, wavelength, dynamic range); the positioning of components (e.g., illuminating source, substrate, sensor); the type and time to replenish the substrate; and others described herein and known to those of skill in the art In one exemplary method for monitoring particulate matter particles are captured from air on one or more substrates. Capturing is performed using one or more of electrostatic and mechanical captors, tools and/or techniques. One or more sensing operations are executed on the captured particles. The captured particles are analyzed based on results of the one or more sensing operations. When the particles are captured on the substrates, the particles are in a controlled position relative to the substrates that can be maintained for a period of time sufficiently long to perform the one or more sensing operations thereon.

In some embodiments, the one or more substrates are conductive. To capture the particles on the one or more substrates, at least one of the one or more substrates are electrically charged with a first charge, and the particles are electrically charged with a second charge. The second charge is the opposite the first charge. Electrically charging the particles with the second charge causes the particles to deflect toward and onto the one or more substrates.

In some embodiments, the one or more substrates include filters. To capture the particles on the one or more substrates, air is enabled to flow through or over the filters of the one or more substrates, thereby causing the particles in the air to be captured by one or more of the filters.

In some embodiments, the one or more substrates are formed by one or more parts of a movable tape. The movable tape includes other parts on which particles are not captured concurrently with the capturing of the particles on the one or more substrates.

In some embodiments, capturing the particles on the one or more substrates includes facilitating the flow of the air toward the one or more substrates using an air pump.

In some embodiments, the one or more substrates include a modified surface facing away from a body of the substrate. The particles are captured on the one or more substrates by adhering to the modified surface of the one or more substrates.

In some embodiments, at least a portion of the one or more substrates on which the particles are captured is replenished by advancing the movable tape such that the capturing of particles is performed on a different portion of the movable tape.

In some embodiments, at least one surface of the one or more substrates on which the particles are captured is cleaned.

In some embodiments, cleaning of the at least one surface is performed using one or more of mechanical and electrostatic cleaners.

In some embodiments, to clean the at least one surface using electrostatic cleaners, the captured particles are electrically charged with a third charge equal to the first charge. Electrically charging the captured particles with the third charge causes the particles to separate away from the one or more substrates.

In some embodiments, the one or more sensing operations are performed by one or more sensors configured to perform one or more of optical sensing, acoustic sensing, electromagnetic sensing, and dielectric sensing.

In some embodiments, the one or more sensors are configured to perform optimal sensing, and the one or more sensors include a camera.

In some embodiments, the one or more sensing operations include optical sensing. To execute the optical sensing of the one or more sensing operations, the one or more substrates are illuminated, and scattered light scattered by the particles captured on the one or more substrates is detected.

In some embodiments, illuminating is performed using light directed at the one or more substrates at a glancing angle.

In some embodiments, imaging the particles captured on the one or more substrates is based at least in part on the scattered light scattered by the captured particles.

In some embodiments, the results of the one or more sensing operations include one or more images of the particles captured on the one or more substrates. Analyzing the captured particles includes identifying particle data corresponding to the particles from the images of the captured particles.

In some embodiments, analyzing of the captured particles includes calculating pollution or particulate matter information based on the particle data.

In some embodiments, dynamic adjustments include adjustments to aspects of one or more of the steps of capturing the particles, executing the one or more sensing operations, and analyzing the captured particles.

In some embodiments, dynamic adjustment includes at least one of: (1) adjusting a volume of the air from which the particles are captured; (2) adjusting a timing for performing the capturing of the particles, executing of the one or more sensing operations, or analyzing the captured particles; and (3) replenishing or cleaning the one or more substrates or surfaces thereof.

In one exemplary embodiment of a system for monitoring particulate matter, a substrate captures particles from air thereon using one or more of electrostatic precipitation and filtration-based capture. A sensor executes one or more sensing operations on the captured particles. At least one processor causes the sensor to execute the one or more sensing operations on the captured particles. The substrate, the sensor and the at least one processor are communicatively coupled. When the particles are captured on the substrate, the particles are in a controlled positioned relative to the substrate that can be maintained for a period of time sufficiently long to perform the one or more sensing operations thereon.

In some embodiments, the substrate includes a conductive material. To capture the particles on the substrate, the substrate is electrically charged with a first charge and the particles are electrically charged in the air with a second charge, the second charge being opposite the first charge. Electrically charging the particles with the second charge causes the particles to deflect toward and onto the substrate.

In some embodiments, the substrate includes filters. To capture the particles on the substrate, air is enabled to flow through or over the filters of the substrate, thereby causing the particles in the air to be captured by one or more of the filters.

In some embodiments, the substrate is formed by one or more parts of a movable tape, the movable tape including other parts on which particles are not captured concurrently with the capturing of the particles on the one or more substrates.

In some embodiments, an air pump is operable to increase or decrease the flow of air. To capture the particles of the substrate, the air pump is caused to increase or decrease the flow of air containing the particles toward the substrate.

In some embodiments, the substrate includes a modified surface facing away from a body of the substrate. The particles are captured on the substrate by adhering to the modified surface of the substrate.

In some embodiments, at least a portion of the tape on which the particles are captured is caused to be replenished by advancing the movable tape such that the capturing of particles is performed on a different portion of the movable tape.

In some embodiments, at least one surface of the substrate on which the particles are captured is caused to be cleaned.

In some embodiments, the cleaning of the at least one surface of the substrate is performed using one or more of mechanical and electrostatic cleaners.

In some embodiments, to clean the at least one surface of the substrate using electrostatic cleaners, the captured particles are electrically charged with a third charge equal to the first charge. The electrical charging of the captured particles with the third charge causes the particles to separate away from the substrate.

In some embodiments, the sensor performs one or more of optical sensing, acoustic sensing, electromagnetic sensing, and dielectric sensing.

In some embodiments, the sensor, which includes a camera, is configured to perform the one or more sensing operations using optimal sensing.

In some embodiments, executing the optimal sensing of the one or more sensing operations includes causing an illuminating source to illuminate the substrate, and detecting, by the sensor, scattered light scattered by the particles captured on the substrate.

In some embodiments, to illuminate the substrate, the illuminating source directs light at the substrate at a glancing angle.

In some embodiments, the sensor images the captured particles based at least in part on the scattered light scattered by the captured particles.

In some embodiments, the captured particles are analyzed based on results of the one or more sensing operations.

In some embodiments, the results of the one or more sensing operations include one or more images of the particles captured on the substrate. To analyze the captured particles, particle data corresponding to the particles is identified from the images of the captured particles.

In some embodiments, analyzing of the captured particles includes calculating pollution or particulate matter information based on the particle data.

In some embodiments, aspects of the system or its operation are dynamically adjusted.

In some embodiments, dynamic adjustment includes at least one of: (1) adjusting a volume of the air from which the particles are captured; (2) adjusting a timing for the capturing of particles from the air or the one or more sensing operations; and (3) replenishing or cleaning the substrate or surface thereof.

In some embodiments, the sensor is an imaging device.

In some embodiments, the imaging device is one of a complementary metal-oxide-semiconductor (CMOS) based image sensor or a charge-coupled device (CCD) based image sensor.

In some embodiments, the substrate includes a patterned conductive layer or a patterned conductive film operable to transmit light.

In some embodiments, the patterned conductive film is indium tin oxide (ITO).

In some embodiments, the substrate forms a waveguide for illuminated light.

In some embodiments, the waveguide comprises mechanical elements that include silicon dioxide.

In some embodiments, the scattered light is scattered with multiple wavelengths of light.

In some embodiments, the illuminating source is a near ultraviolet (UV) or visible light.

In some embodiments, the substrate and/or sensor move relative to one another.

In some embodiments, the substrate is flexible.

In one exemplary embodiment of a system for monitoring particulate matter, a particle capturing subsystem includes a substrate. The particle capturing subsystem is operable to capture particles from air on the substrate. A sensing subsystem includes one or more sensors for performing sensing operations on the particles captured on the substrate. A replenishing subsystem replenishes the substrate or a surface of the substrate by remove all or a portion of the particles captured thereon. An analytics subsystem performs analysis operations based on results of the sensing operations performed on the particles.

BRIEF DESCRIPTION OF DRAWINGS

The present application will be more fully understood from the following detailed description taken in conjunction with the accompanying drawings, in which:

FIG. 10A is a diagram illustrating one exemplary embodiment of sensing features of the PM sensor of FIG. 2;

FIG. 11C is one exemplary embodiment of an image of captured particles of tree/shrub pollens;

FIG. 11D is one exemplary embodiment of an image of captured particles of weed pollens;

FIG. 11E is one exemplary embodiment of an image of captured particles of a test powder;

DETAILED DESCRIPTION

Figure 1:
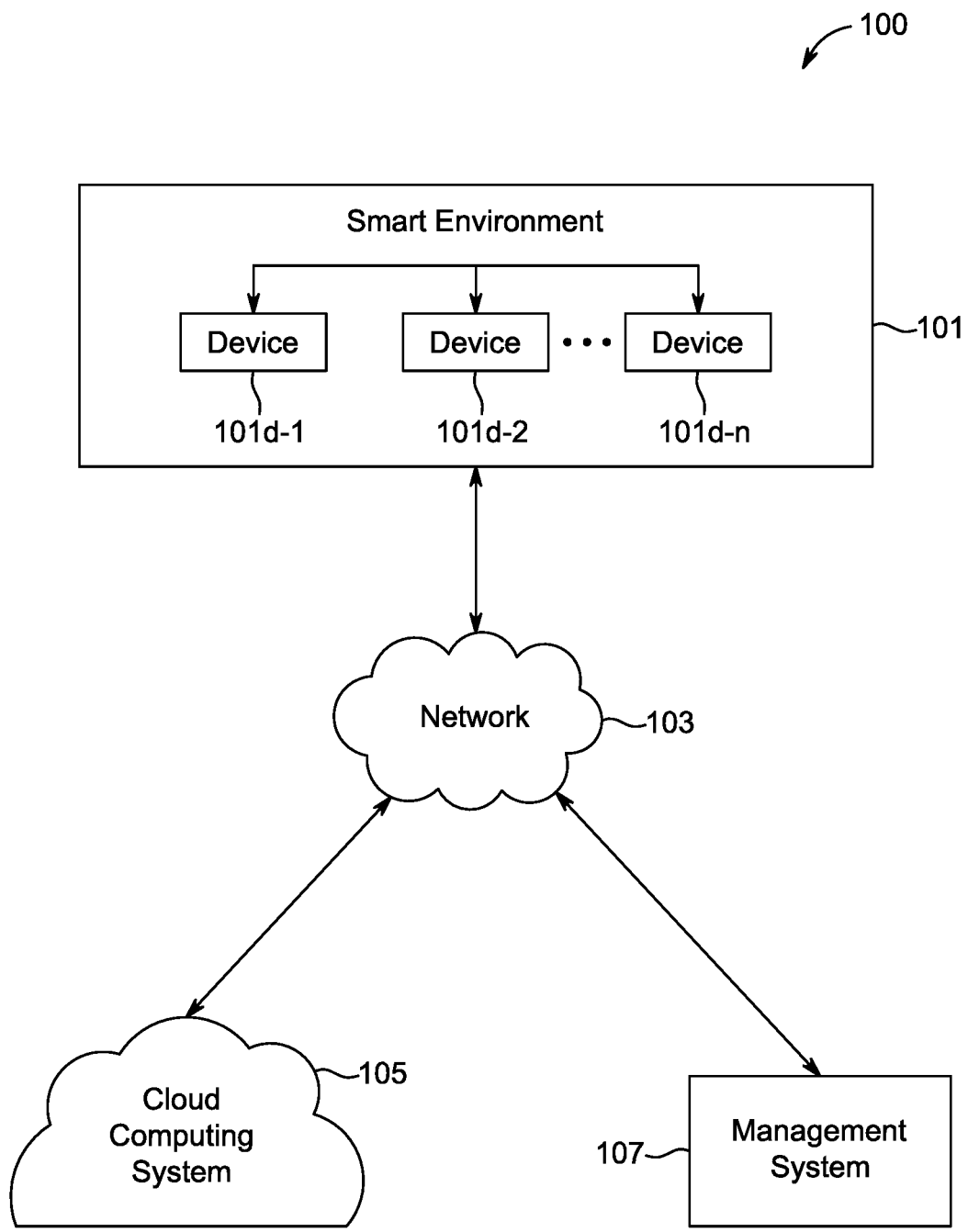
FIG. 1 is a schematic diagram of one exemplary embodiment of an ecosystem that includes a particulate matter (PM) sensor for monitoring air.

Certain exemplary embodiments will now be described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-numbered components of various embodiments generally have similar features when those components are of a similar nature and/or serve a similar purpose. A person skilled in the art, in view of the present disclosure, will understand various instances in which like-numbered components across various figures are akin. Additionally, in a number of instances, various terms understood or otherwise known to those skilled in the art, and/or provided for in the present disclosure, are used interchangeably. By way of non-limiting example, terms such as capture and collect, device and system, light and illumination, may be used interchangeably herein.

The systems and methods provided herein are for monitoring air particulate matter (PM) by capturing particles on a substrate and performing sensing operations while the particles are captured. While the described systems and methods can perform various sensing operations described herein and known to those of skill in the art, one sensing operation is imaging of the captured particles using an imaging sensor such as a camera. Moreover, while the described systems and methods are described herein for use with monitoring air particulate matter, they can be readily adapted for monitoring other fluid environments including water. To this end, a PM sensor or system captures particles from air for imaging while captured. The particles can be captured using electrostatic and/or mechanical tools and techniques (referred to interchangeably as "captor"), such as electrostatic precipitation or filtration mechanisms used in high efficiency particulate arrestance (HEPA) filters, to drive or attract the particles toward the substrate. As described herein, various tools and techniques can be used, and can be based on the purpose of the PM system (e.g., whether particles are being captured from air or fluids). It should be understood that, while small particles tend to stick to most surfaces even without surface modification, substrate surfaces can in some embodiments be modified to enhance or control adhesion. For instance, as described herein, an adhesive layer (e.g., a layer of adhesive glue), or a molecular layer can be provided. Moreover, in some embodiments, glass substrates may be modified using silane chemistry to make the surface of the substrate hydrophilic, hydrophobic, oleophilic, oleophobic, and the like. Other substrates can be textured at the microscale or nanoscale to facilitate cleaning, or to otherwise enhance the function of the device.

In some embodiments, electrostatic particle capturing tools and techniques can include the use of electrostatic precipitation and/or an electrostatic precipitator, which causes particles from the air to deflect toward and to a conductive substrate by charging particles and the substrate with opposite charges. That is, the opposite charges cause the particles to be driven to the substrate, where they are captured. Mechanical particle capturing tools and techniques can include the use of a filtration system. The filtration system can be made up of a filter and/or a mat of fibers functioning as a substrate. The filter and/or fibers are configured to intercept particles from the air as air flows therethrough. The flow of air or volume of air from which particles are captured can be controlled by an air pump, air injection or exhaust systems, or any other methods for moving air known to those of skill in the art. In some embodiments, the natural movement of air, such as due to wind, may be used to sample air in a passive manner. The PM system can include or be communicatively coupled to air flow sensor to measure the amount of passing air.

Further in connection with the PM sensor described herein, the captured particles can be sensed or read using a sensor, such as an imaging sensor. Of course, other types of sensing can be provided by the sensors, including optical sensing, acoustic sensing, electromagnetic sensing, dielectric sensing, and others known to those of skill in the art, using respectively configured sensors. The imaging sensor can include a camera and an illuminating source that directs light at the substrate on which the particles are captured. The light can be ultraviolet (UV) (e.g., near-UV) light or light from a light-emitting diode (LED). The illuminating source can be positioned such that it directs light at the substrate, causing the particles captured on the substrate to scatter light. In some embodiments, to avoid direct illumination of the imaging sensor (e.g., caused by reflection), the light can be directed at a glancing angle and/or the substrate can be configured as a waveguide. In turn, the scattered light is detected by the camera and, based thereon, images of the particles can be obtained. The digital images or sensing results can be stored by the sensor or by an associated or communicatively coupled device, such as a cloud computing system or a management system.

The images or other sensing or reading results obtained by the sensor can be used to perform analyses thereon, such as air pollution analyses. Such analyses can include detecting or calculating particle information (e.g., size, position, distribution), or deriving other data therefrom (e.g., type, source). The types of calculated information or derived data can greatly vary depending on, among other things, the purpose or target of the PM sensor. For example, a PM sensor disposed indoors (e.g., in a building) can be programmed to detect different types of particle data (e.g., type of pollutant, source, etc.) than a PM positioned outdoors (e.g., on a traffic light). It should be understood that the analysis of the sensed particles can be performed locally by the PM sensor and/or by an analytics system of the PM sensor. The analysis can be performed by or in conjunction with an associated or communicatively coupled system, such as a cloud computing system or management system, which can store data (e.g., particle sensing results, historic data, thresholds, models, rules) and/or provide access to services and applications, for example. Results of the analysis can be stored or further processed to determine and/or trigger further action, such as preparatory, remedial, or containment events. Air monitoring, or portions thereof, can be performed continuously or intermittently, as deemed optimal or preferable based on the purpose of the PM sensor and its characteristics. For example, particle collection can be performed continuously, while imaging and other sensing and analysis is performed at intervals (e.g., every hour).

The substrate on which particles are collected can be replenished, for example, to ensure that continued accumulation of particles on the substrate does not render the PM sensor useless. To this end, the substrate can be replenished by cleaning the surface of the substrate on which particles are captured and/or by replacing a portion of the surface on which particles are captured. Cleaning of the substrate or substrate surface can include the use of electrostatic and/or mechanical tools and techniques. Electrostatic cleaning involves the application of a reverse charge (e.g., a charge equal to the charge of the substrate) on the captured particles, causing them to detach or disengage from the substrate. Mechanical cleaning approaches include the use of a brush, vibration, heating, or the like to cause the particles to detach or disengage from the substrate.

In addition to or as an alternative to cleaning, the substrate or surface of the substrate can be replaced, thereby providing a particle-free area on which particles can be captured for analysis. To this end, the PM sensor can include a tape case that includes a roll of tape. The tape on the roll of tape can function as the substrate itself, or can be disposed on top of the substrate. A section of the tape is exposed and used as the area on which particles can be accumulated. At a desired time, such as when a large number of particles have been collected on that section of the tape, the tape case can cause the tape to advance and a new (e.g., particle free) section of tape to be exposed as the area on which particles are accumulated. Sections of tape having particles accumulated thereon can later be physically stored for subsequent testing or analysis. Replenishment of the substrate or substrate surface can be performed at any time deemed optical or preferable, including at times corresponding to a schedule or dynamically determined times.

The PM sensor described herein provides for dynamically monitoring air particulate matter. To this end, throughout the monitoring process, the PM sensor can identify in real-time if dynamic adjustments have been triggered by an identified requirement or option. It should be understood that dynamic adjustments (and other triggered actions or processes) can be triggered by an identified requirement (e.g., a hard rule, threshold) or by an identified option (e.g., soft rule, manual input of user's desire). Examples of dynamic adjustments include those related to the volume of collected air for capturing particles therefrom, component positioning (e.g., sensor, illuminating source), imaging specifications (e.g., wavelength), replenishment, dynamic range, and others described herein and known to those of skill in the art. In this way, the PM monitoring system can provide optimal particle sensing and analysis, and optimize its functionality.

Air Particulate Matter Monitoring Ecosystem

FIG. 1 illustrates an exemplary embodiment of an ecosystem 100 for monitoring air particulate matter using, for example a particulate matter (PM) sensor as described herein. The ecosystem 100 includes various systems, sensors, objects, networks, infrastructures and the like that can be used in some embodiments to collect and monitor air particulate matter data, and to trigger actions, events, functions or the like based on the monitoring. It should be understood that the air particulate matter monitoring ecosystem 100 can include any number and type of interconnected systems, sensors, objects, networks, infrastructures and the like, of which those illustrated in FIG. 1 serve as illustrative examples. For instance, the ecosystem 100 can refer to the Internet of Things (IoT) a public or private network, or any similar set of interconnected devices. It should also be understood that, in the illustrated exemplary particulate matter monitoring ecosystem 100, data can be transferred via wired or wireless communications, using standards or protocols such as those described herein and others known to those of skill in the art.

As shown in FIG. 1, the ecosystem 100 includes a smart environment 101, which is connected to a cloud computing system 105 and a management system 107 via a network 103. The smart environment 101 can be any object, structure, or area that is equipped with or has hardware (e.g., sensors) or functionality that can collect and/or communicate data. For example, the smart environment 101 can be or include objects such as a cars and planes, a structure such as a building or a house, or an area such as a street, neighborhood or city. In some embodiments, the smart environment 101 is an object, structure, and/or area in which monitoring air particulate matter is desired, preferred, or required. Non-limiting examples of instances in which monitoring of air particulate matter is performed include for environment impact testing, auditing and compliance management, and emergency response assistance, among others.

As described above, the smart environment 101 can include one or more of a variety of devices that are embedded with or include electronics, software, sensors, actuators, and/or connectivity to enable them to collect data and/or communicate with one another (e.g., send and/or receive data). It should be understood that the term devices is used to refer to systems, subsystems, and other electronic or computing components known to those of skill in the art, all of which may be used interchangeably herein. Moreover, it should be understood that, as known to those of skill in the art, the devices of the smart environment 101 can be or refer to objects, items or things that are traditionally not capable of collecting or communicating data, but have been equipped or configured with functionality (e.g., sensors, connectivity) to do so.

As illustrated in FIG. 1, the smart environment 101 can include devices 101*d*-1, 101*d*-2, . . . , and 101*d*-*n* (collectively referred to herein as "101*d*" or "devices 101*d*"). In one exemplary embodiment in which the smart environment 101 is a smart city, the devices 101*d* can be or include, for example, fixed objects such as sensors, city lights, buildings, traffic lights, cameras, alarms, or passive objects such as trains, automobiles, mobile devices, computer. It should be understood that each of the devices 101*d* can refer to a collection of components (e.g., a building having various sensors), or can refer to a specific one of a collection of components (e.g., a single sensor in a building).

One type of device in the smart environment 101 is a PM sensor, referred to hereinafter as PM sensor 101*d*-1, though the smart environment 101 can have any number of PM sensors. The PM sensor 101*d*-1 can be equipped on or deployed in a variety of ways, depending on, for example, its intended purpose and/or the type of smart environment. For example, the PM sensor 101*d*-1 can be used indoors in a smart building to monitor the building's interior air quality, or in a smart city to monitor the city's outdoor air quality. In some embodiments, the PM sensor 101*d*-1 is positioned such that it can have sufficient and/or optimal exposure to the air or air flow being measured for pollution. The PM sensor 101*d*-1 and its functionality is described in further detail below.

As described above, the smart environment 101 is connected to the cloud computing system 105 and the management system 107 via a network 103, for example, to provide centralized monitoring and functionality (e.g., services, storage). It should be understood that although a single cloud computing system 105 and a single management system 107 are illustrated in FIG. 1, the ecosystem 100 can include any number of cloud computing systems 105 and/or management systems 107. The cloud computing systems 105 can be or include public clouds or private clouds.

It should be understood that the network 103 can include one or more networks. Non-limiting examples of the network 103 include the Internet, a private area network (PAN), a local area network (LAN), a wide area network (WAN), a metropolitan area network (MAN), an enterprise private network (EPN), a virtual private network (VPN), and the like. It should be understood that communications via the network 103, and/or other communications described herein between systems of the ecosystem 100 (e.g., device to device, device to cloud) can be performed using a variety of wired and wireless techniques, standards and protocols, known to those of skill in the art, including Wi-Fi, Bluetooth, Bluetooth Low Energy (BLE), and cellular (e.g., 3G, 4G, LTE) or satellite service.

The cloud computing system (also referred to herein as "cloud") 105 refers to infrastructure made up of shared computing devices and data that is accessible to systems and devices such as those of the smart environment 101 and/or the management system 107. The shared computing resources can include networks, servers, storage, applications, and services. A person of skill in the art will understand that any type of data and devices can be included in the cloud 105. One non-limiting example of contents in the cloud 105 include air particulate matter data, for example, that is collected from the PM sensor 101*d*-1. Applications and services in the cloud 105 can include a PM monitoring application or the like, which can be used to provide monitoring, analytics and/or other processing of the air particulate matter data as described herein and known to those of skill in the art. In the exemplary scenario in which the smart environment 101 is a smart city, the air particulate matter data collected from the PM sensor can be stored in the cloud 105, for instance, and can be used (e.g., by the PM monitoring application) to derive or identify therefrom, for example, potentially toxic levels of pollution or unexpected patterns of pollution growth. It should be understood that services and applications (e.g., PM monitoring application) that can alone or in combination be used to monitor, analyze and/or process air particulate matter data can be stored in and/or provided by the cloud 105, the management system 107, and/or other systems and/or entities not described herein (e.g., research institution systems). In some embodiments, the cloud 105 can store models and rules that can be used by a PM monitoring application to analyze the data and output feedback, instructions and the like. Moreover, in some embodiments, the cloud 105 can include or employ artificial intelligence tools and techniques during analysis of the air particulate matter data, as known to those of skill in the art.

The management system 107 refers to one or more systems or devices that are or can be used to monitor and/or manage the air particulate matter data collected from the PM sensor 101*d*-1. For example, in an example scenario in which the PM sensor 101*d*-1 is part of a smart city type of smart environment 101, the management system 107 can be made up of a number of systems (e.g., computing devices) that are managed by or correspond to the smart city 101, such as public services systems (e.g., utilities), public safety systems (e.g., firefighters, police), and health systems (e.g., hospitals). The management system 107 can also or alternatively a single device, such as a smartphone. For instance, in an example scenario in which the PM sensor 101*d*-1 is part of a smart home type of smart environment 101, the management system 107 can be as simple as one or more smartphones used by the homeowner to monitor and/or manage the pollution in his/her home. Although illustrated separately from the smart environment 101, in some embodiments, the management system 107 can be a part of the smart environment 101. For example, a computing system in a smart home equipped with a PM sensor 101*d*-1 can both serve as one of the connected devices 101*d* of the environment 101 (e.g., as a sensor to collect data such as acoustic data), and as the management system 107 (e.g., to manage/monitor the air particulate matter data). It should be understood that, in some embodiments, the management system 107 and the smart environment 101 (or its devices 101*d*) can communicate directly rather than through the network 103, for example, using Bluetooth, near field communication, BLE, or other protocols and standards known to those of skill in the art.

It should be understood that the storage and services (e.g., PM monitoring application) of the cloud 105 described above can be accessed by the management system 107 via the network 103, for example. In some embodiments, the management system 107 can access cloud-based services and/or air particulate matter data from the cloud 105 to provide PM monitoring, management or other analytics processing. In some embodiments, the management system 107 can instead provide a part or all of these storage and services for PM monitoring, management and analytics. For example, a smartphone configured as a management system 107 can receive data from the PM sensor 101*d*-1 that is obtained from collected particles, store that air particulate matter data, and/or deploy local or remote applications (e.g., PM monitoring application) for monitoring, managing and providing other analytics of or with the data.

Monitoring, managing and/or otherwise analyzing the air particulate matter data is described in further detail below. Nonetheless, it should be understood that the collected, calculated or otherwise processed data can simply be stored (e.g., for future research, historical recordkeeping, etc.) or can be used to trigger one or more actions or events. For example, based on an analysis of sensed air particulate matter data, the PM monitoring application can cause alarms to be triggered, notifications to be delivered, systems to be turned on (e.g., ventilation), and other preparatory or remedial actions, among others, to be initiated. A person of skill in the art will understand the many processing and analytics steps that can be performed using the sensed air particulate matter data, and the variety of subsequent actions that can be triggered thereby.

Air Particulate Matter (PM) Sensor

Figure 2:
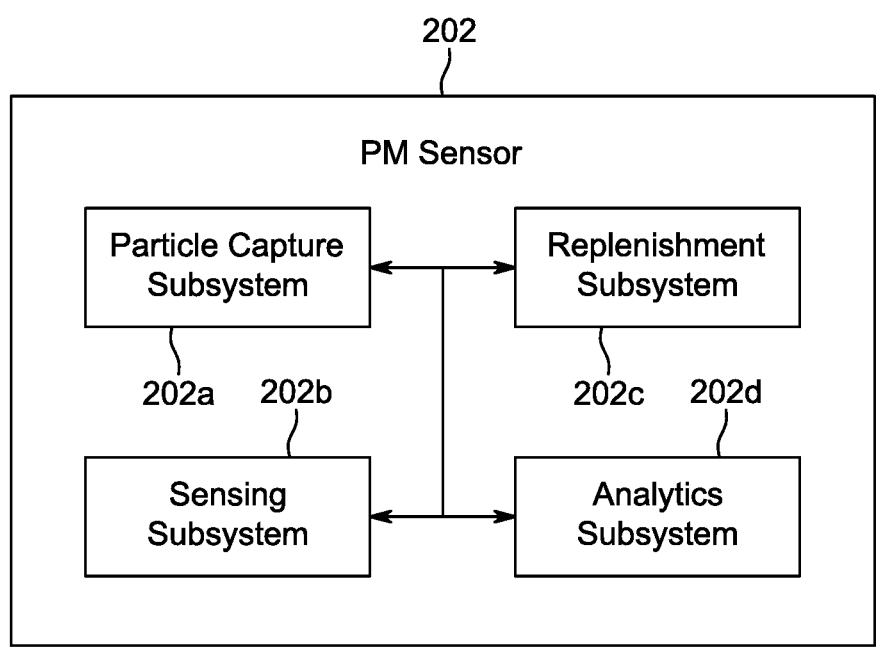
FIG. 2 is a schematic diagram of one exemplary embodiment of the PM sensor of FIG. 1.

As explained above, an air particulate matter (PM) sensor (also referred to as "PM sensor") such as PM sensor 101d-1 can be deployed in an environment to monitor air PM matter by, among other things, capturing particles, identifying the captured particles and performing analytics based on information collected from the captured particles. FIG. 2 illustrates a system architecture diagram of the PM sensor 101d-1 of FIG. 1, labeled as element "202" in FIG. 2 and hereinafter referred to interchangeably as "202" or "PM sensor 202." As shown in FIG. 2, in some embodiments, the PM sensor 202 can include a particle capture subsystem 202a, for capturing particles onto a substrate, a sensing subsystem 202b, for performing sensing operations on the captured particles, a replenishment subsystem 202c, for cleaning or replenishing the substrate on which particles are captured, and an analytics subsystem 202d, for performing analytics operations based on the sensing of the captured particles. A summary of the functionality of these subsystems is now described in connection with at least FIG. 3, which illustrates a working principle of the PM sensor 202 according to an exemplary embodiment.

Figure 3:
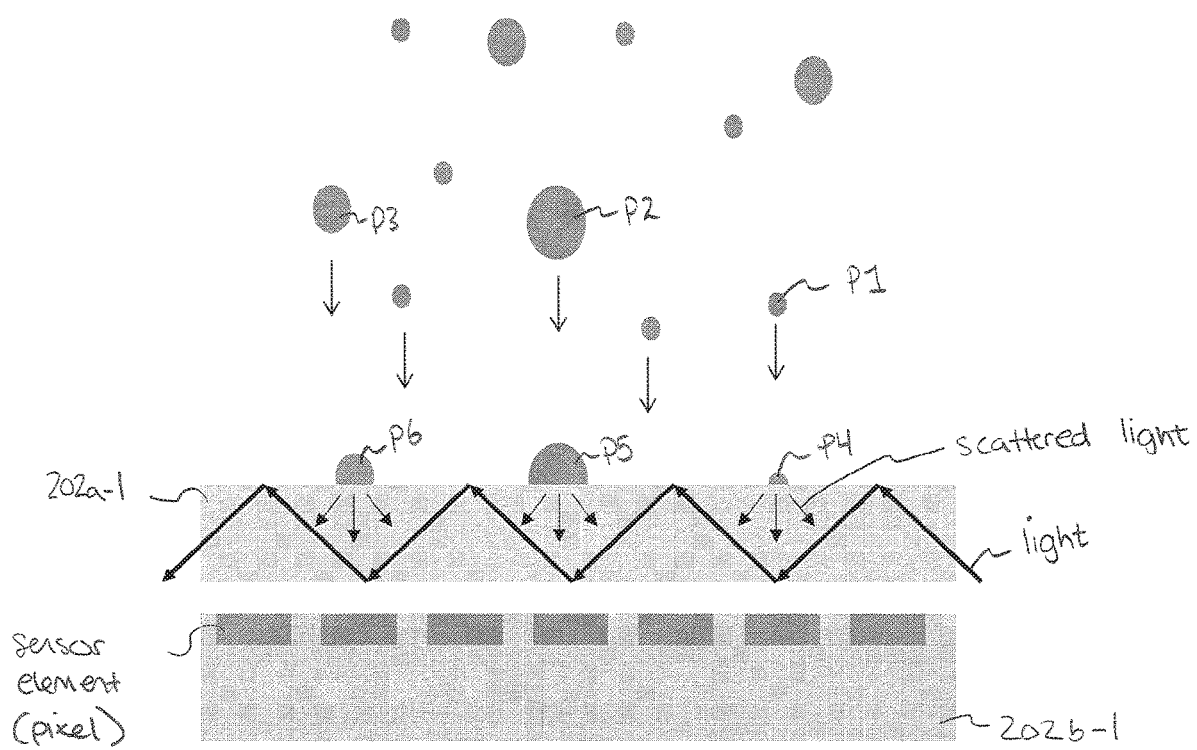
FIG. 3 is a diagram illustrating one exemplary embodiment of the PM sensor during an air monitoring process.

Generally, the particle capture subsystem 202a can be used to drive particles P1, P2, P3, P4, P5, P6, etc. (collectively "P" or "particles P") in the air towards and onto a substrate 202a-1, as shown in FIG. 3. The particles P can be driven towards the substrate 202a-1 using, for example, a pump and/or electrostatic precipitator (ESP) (not illustrated in FIG. 2). The captured particles P4, P5 and P6 (collectively "CP" or "captured particles CP") are collected on the substrate 202a-1. In turn, the sensing subsystem 202b is used to detect or measure information about the collected particles CP. As explained in further detail below, the sensing subsystem 101 can include one or more sensors (and complementary components) that are configured to provide optical sensing, acoustic sensing, electromagnetic sensing, dielectric sensing, and others known to those of skill in the art. For example, as shown in FIG. 3, the sensing subsystem 202b can be or include an optical sensor 202b-1, such as a charge-coupled device (CCD) or complementary metal-oxide-semiconductor (CMOS) chip that comprises an array of sensing elements (e.g., pixels). The substrate can be in proximity to the sensor such that light scattered from a particle is received by one or more pixels, as shown in FIG. 3. In some embodiments, the sensing subsystem 202b-1 can include an intervening lens or lens system disposed between the captured particles and the chip or optical sensor 202b-1. The lens or lens system can be used to create an image of the light scattered from the particles on the optical sensor, resembling a camera or microscope with different magnifying powers. As shown in FIG. 3, the sensing subsystem 202b-1 can include an illumination source (e.g., light source) to illuminate the captured particles, causing them to scatter light such that the sensor 202b-1 can detect information based on, among other things, the scattering of the light directed by the illumination source. The replenishment system 202c can be used to clean and/or replenish the substrate or surface of the substrate on which the particles CP are collected. The data (e.g., images) of the collected particles CP that is detected by the sensing subsystem 202b is transmitted or made available to the analytics subsystem 202d, which can in turn analyze the data to, among other things, derive or calculate information about the collected particles CP and/or the environment from which they were collected (e.g., smart environment 101) in accordance with the purpose or configuration of the PM sensor 202. As described in further detail below, all or part of the functionality of the analytics subsystem 202d can be provided at or by the PM sensor 202 and/or by one or more connected devices (e.g., cloud computing system 105, management system 107).

Figure 4:
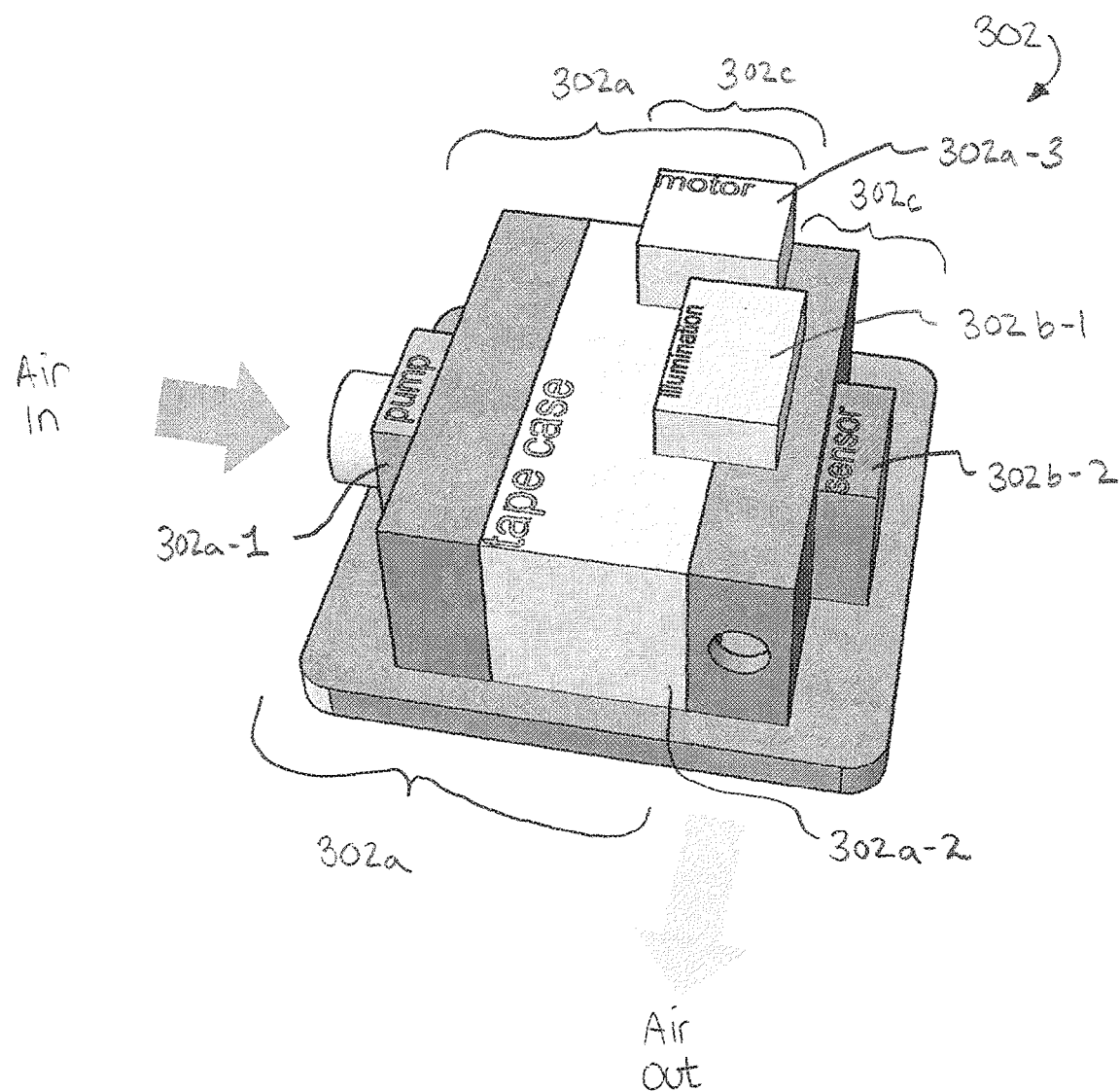
FIG. 4 is a schematic, perspective view of one exemplary embodiment of the PM sensor of FIG. 2, having a tape case.

FIG. 4 illustrates and external, perspective view of one exemplary embodiment of a PM sensor 302. As shown, the PM sensor 302 includes a pump 302a-1 that drives or facilitates the intake of air, a tape case 302a-2 that can function as or be part of the substrate onto which particles are captured, and a motor 302a-3 configured to drive at least the tape case 302-a-2. The pump 302a-1, tape case 302a-2 and motor 302a-3 can form or be part of a capture subsystem 302a of the PM sensor 302. It should be understood that, although not illustrated in FIG. 3, as described herein, the capture subsystem 302a can include other features and/or components for capturing particles, such as the substrate, a precipitator, a filtration system, and others known to those of skill in the art. Still with reference to FIG. 4, the PM sensor 302 includes an illumination source 302b-1 and an sensor 302b-2, which together form or are a part of a sensing subsystem 302b. In some embodiments, the tape case 302a-2 (and/or tape therein) and motor 302a-3 can also or alternatively form a part of a replenishment subsystem 302c. That is, the motor 302a-3 can be used to cause a roller disposed in the tape case 302a-2 to activate, which can in turn cause the tape on which particles were collected to be replaced by a new, clean or particle-free section of tape from the roll or strip of tape. It should be understood that, although not illustrated in FIG. 4, the PM sensor 302 can include an analytics subsystem to process the obtained particle data. The analytics subsystem can be embedded in or communicatively coupled to the PM sensor 302.

The PM sensor 202 and its subsystems are now described in further detail in connection with at least the activity diagram of FIG. 5.

Air PM Monitoring and PM Sensor Subsystems

Figure 5:
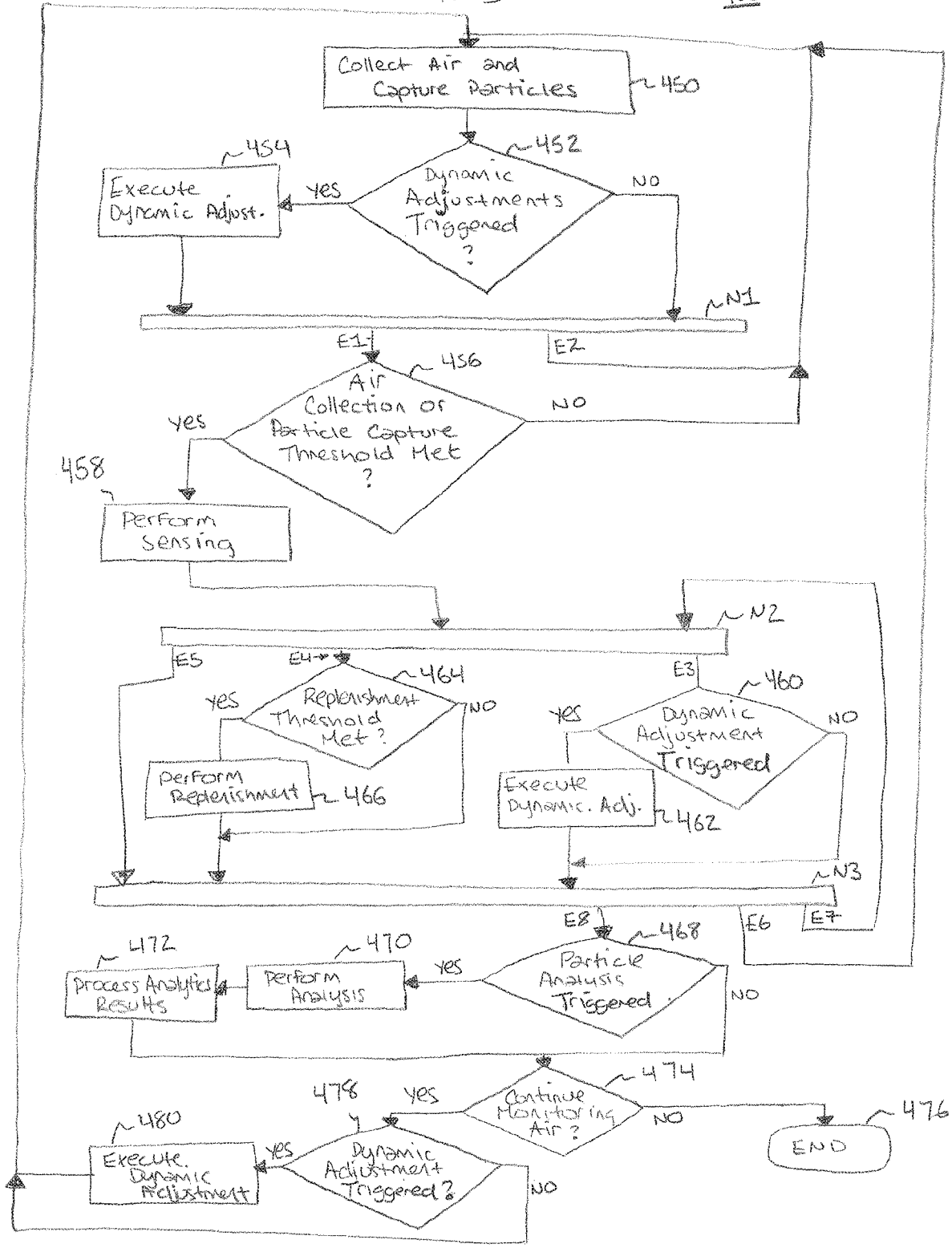
FIG. 5 is an activity diagram illustrating one exemplary embodiment of an air monitoring process using the PM sensor of FIG. 2.

FIG. 5 is an activity diagram illustrating one exemplary process 400 for monitoring air particulate matter (PM). In the process 400, monitoring air particulate matter can be performed using a PM sensor such as PM sensor 202 of FIG. 2, and its subsystems. The subsystems of the PM sensor are described below in connection with the monitoring process of FIG. 5.

Particle Capture Subsystem

As shown in FIG. 5, the monitoring process can begin at step 450, in which air is collected from the environment and particles from the air are captured by the particle capture subsystem 202a of the PM sensor 202. Various techniques can be used to drive air into the PM sensor 202 and/or toward the substrate, and to capture particles from the collected air. Such techniques can include one or a combination of mechanical compression, suction or diffusion-based capture, electrostatic capture, capture using acoustic and/or dieletrophoretic forces, means of manipulating particles in fluids including air, and others known to those of skill in the art. In some embodiments, capturing particles includes causing particles from air to deflect toward and to a substrate. In some embodiments, capturing the particles includes the captured particles being in contact with the substrate or in contact with another particle or object that is itself in contact with the substrate. In some embodiments, capturing the particles includes having control of the position of the particles while they are in contact with or substantially proximate to the substrate. The capture of the particles, in some embodiments, occurs for a sufficiently long amount of time to perform the desired sensing operations thereon. In some embodiments, particles are deemed captured if they are in contact with or substantially proximate to the substrate, with sufficient attachment or capture force, such that the particles do not separate from the substrate or become uncaptured under constant air or air flow conditions, or without a reverse or detaching action or force being applied thereto.

Figure 6:
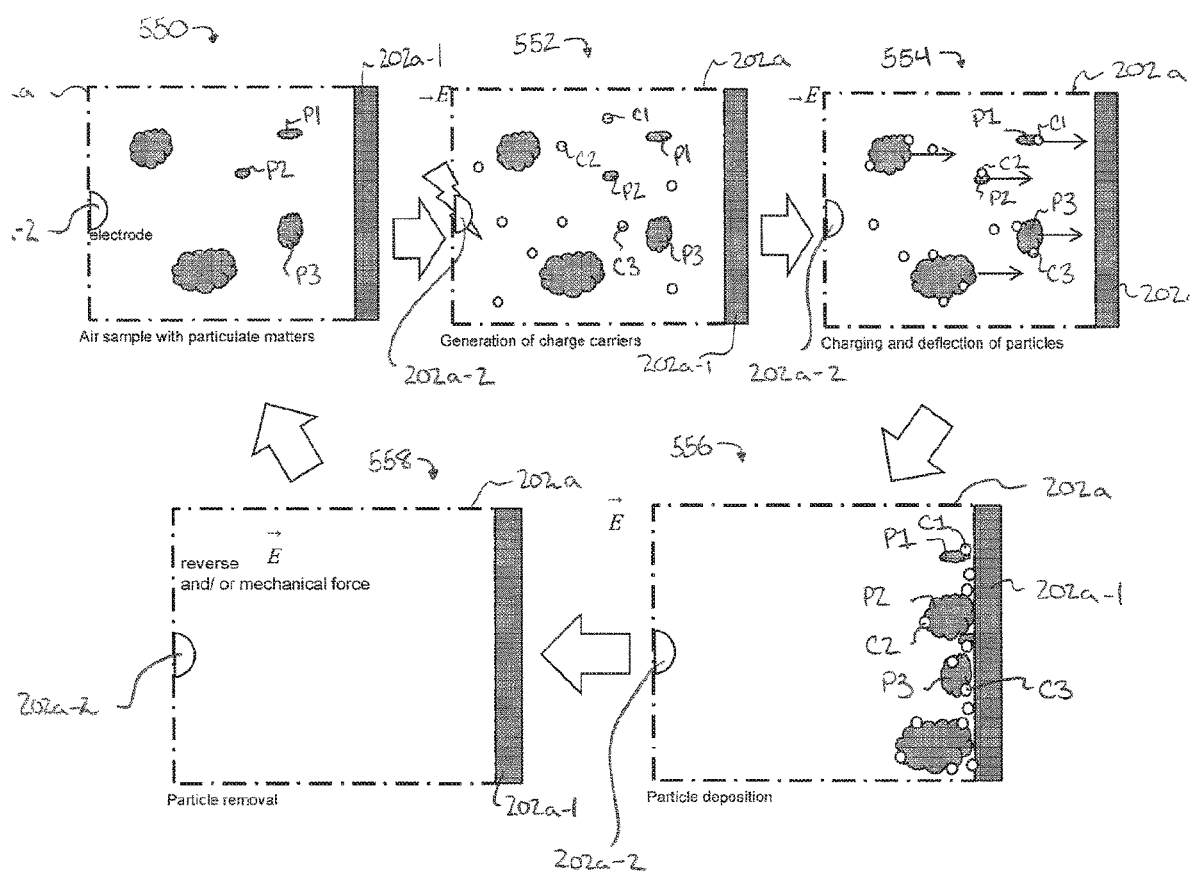
FIG. 6 is a diagram illustrating one exemplary embodiment of the process of capturing particles of FIG. 5, using electrostatic precipitation.

In some embodiments, the capture subsystem 202a can be configured to perform electrostatic precipitation to capture particles from the collected air. As known to those of skill in the art, electrostatic precipitation is a technique in which electric potential or charge is generated and applied to the collected air. The charge is configured to separate particles from the air without impending the flow of the air. FIG. 6 illustrates a series of steps 500 for capturing particles from air using electrostatic precipitation, according to an exemplary embodiment. As shown in FIG. 6, at step 550, the particle capture subsystem 202a includes a substrate 202a-1 and an electrode 202a-2. FIG. 6 also shows illustrative particles P1, P2 and P3 that are contained in the air, which is illustrated by the colorless areas within the subsystem 202a and surrounding the particles P1, P2 and P3, etc.

In turn, at step 552, a charge E is applied to the electrode 202a-2, causing charge carriers C1, C2, C3, etc. (collectively "C" or charge carriers C") to be generated and dispersed into the collected air. It should be understood that the charge E applied to the electrode 202a-2 is the opposite of the charge of the substrate 202a-1. At step 554, the charge carriers C caused to be emitted by the application of the charge E to the electrode 202a-2 are in turn picked up by the particles P, causing the charged particles P to deflect towards or be attracted to the oppositely charged substrate 202a-1. Continued application of the charge to the electrode 202a-2 and thus of charge carriers C to the particles P causes the particles P to be captured or deposited at the substrate 202a-1, as shown at step 556 of FIG. 6. In some embodiments, electrostatic precipitation can be used to remove particles from the substrate 202a-1. As shown at step 558, a charge –E, opposite the charge applied at step 552, is applied to the electrode 220a-2, thereby causing the particles to be separated from the equally charged substrate 220a-1. It should be understood that, in some embodiments, removal of particles using the electrostatic precipitation of step 558 can be performed in connection with a replenishment process, as described in further detail below.

Figure 7:
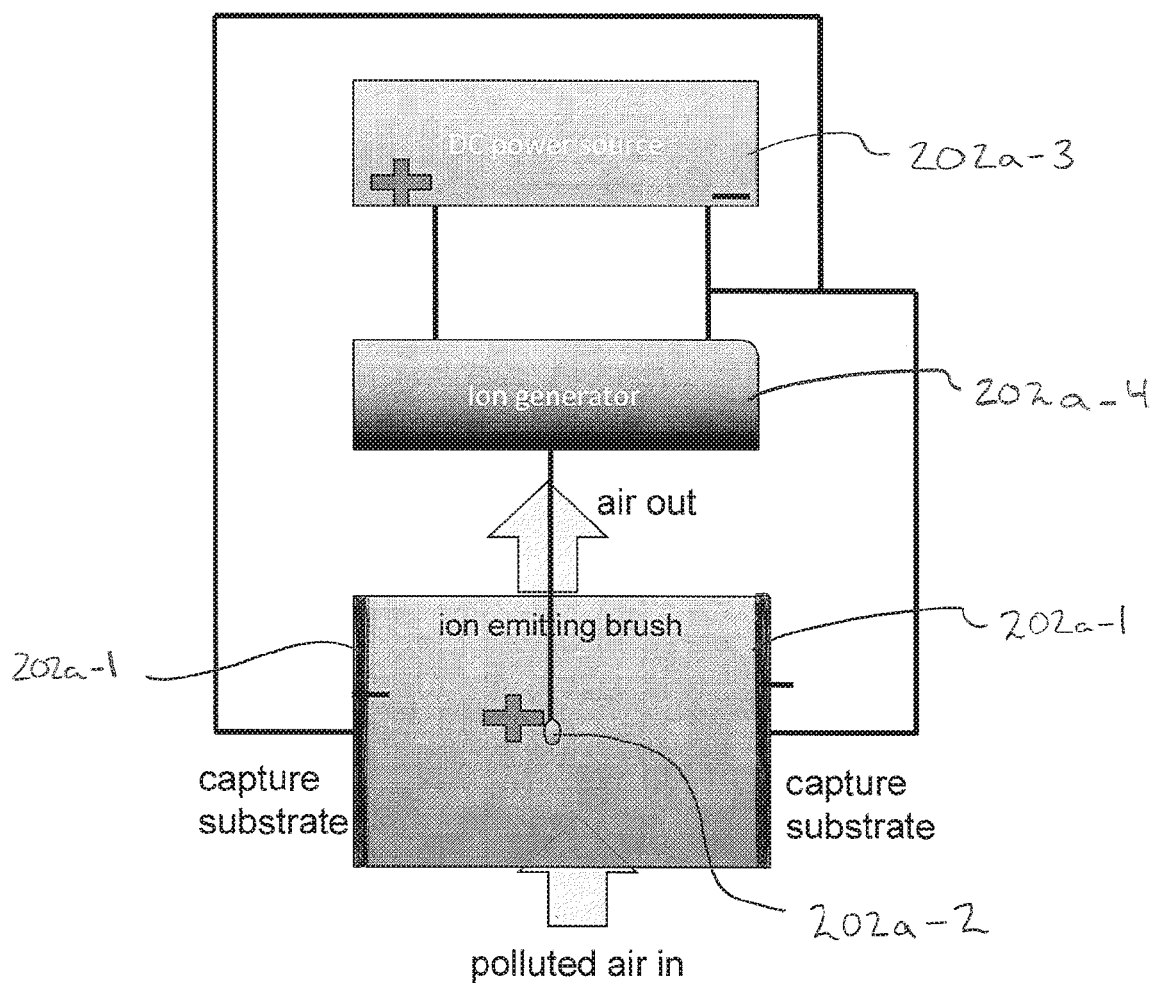
FIG. 7 is a diagram illustrating one exemplary embodiment of the charge generation and charge distribution for performing the electrostatic precipitation of FIG. 6.

FIG. 7 is a diagram illustrating one example embodiment of the charge generation and distribution for performing electrostatic precipitation. More specifically, FIG. 7 illustrates exemplary components of the particle capture subsystem 202a. As shown, the particle capture subsystem 202a can include a DC power source 202a-3, an ion generator 202a-4, ion emitting brush constituting an electrode 202a-2, and multiple substrates 202a-1 (referred to interchangeably as "capture substrate" given their configuration to capture particles thereon). In some embodiments, the ion generator 202a-4 can produce voltage of ~3000V and 1.9 billion ions/cc. The capture substrates 202a-1, in one non-limiting illustrative example, can include or be made of copper, and/or can be polished with a metal polish and alumina suspension. One non-limiting, illustrative example of the capture substrates 202a-1 can be formed of approximately 99% copper and have a thickness of approximately 0.2 mm. In some embodiments, the capture substrate can measure approximately 1 cm$^2$ Still with reference to FIG. 7, as can be seen, the DC power source 202a-3 can generate positive and negative charges. The positive and negative charges can be transmitted to the ion generator 202a-4. The ion generator can therefore transmit a positive charge to the electrode 202a-2 and negative charge to the capture substrates 202a-1. As a result, as the polluted air is driven or permitted to flow between the capture substrates 202a-1, positive charge carriers are emitted by the electrode 202a-2 and onto the collected air. The negative charge of the of the capture substrates 202a-1 cause the oppositely charged particles to be deflected toward the substrates 202a-1. The air, having the particles removed therefrom, is allowed to flow out of the PM sensor 202.

In some embodiments, in addition or alternative to the electrostatic precipitation functionality described above, the particle capture subsystem 202a can include a filtration system for collecting air and capturing particles at step 450 of FIG. 5. A mechanical filtration system, for example, can, in some embodiments, be aided or facilitated by providing in the particle capture subsystem 202a an air intake system, air injection system, air pump, vacuum pump, and/or any type of system or method configured to move air and/or drive the flow of air from which particles or particulate matter is to be captured. In some embodiments, the natural movement of air, such as due to wind, can be used or relied upon to move air in a passive manner. The PM sensor can include or be communicatively coupled to an air flow sensor configured to measure the amount of air passing through the PM sensor. In some embodiments, the volume of the PM sensor (e.g., a few milliliters) is small compared to the volume of air sampled (e.g., a few milliliters to more than one liter). For example, the substrate area of the PM sensor can range, in some illustrative examples, from less than approximately 0.1 mm×0.1 mm to approximately 1 cm×1 cm, and to approximately a few square centimeters or more. Air flow rates, in some illustrative examples, can range from less than approximately 1 standard cubic centimeters per minute (sccm) to approximately 10, 100, 1000, 10,000, 100,000 or more sccm. In some embodiments, the PM sensor can be configured to compress the air to enable more efficient capture of particulate matter at a smaller flow velocity.

Figure 8:
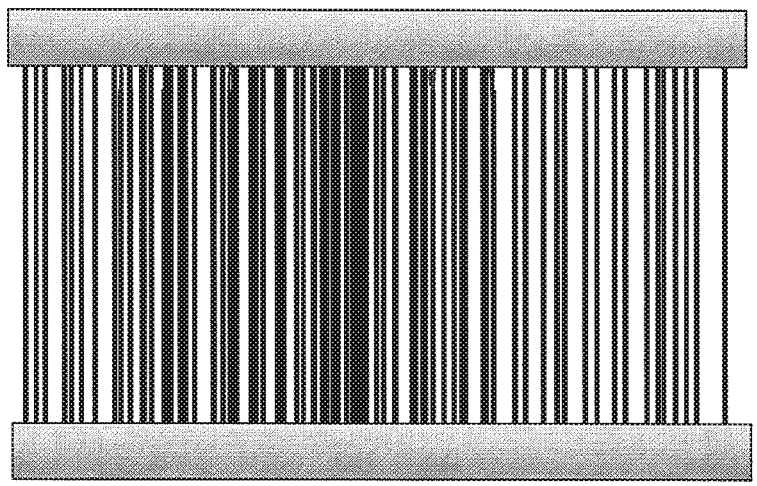
FIG. 8 is a diagram illustrating one exemplary embodiment of a filtration system for performing the process of capturing particles of FIG. 5.

FIG. 8 illustrates a filtration system 202a-5 according to an exemplary embodiment. The filtration system 202a-5 can be a filter or the like, formed of fibers (also referred to interchangeably as "filtration membranes" and "fiber membranes"), and configured to capture or trap particles from air as the air flows therethrough. It should be understood that, in some embodiments, the filter and/or its fibers can be considered to be the substrate on which particles are captured. For example, the filter can be a high-efficiency particulate arrestment (HEPA) filter or the like. In some embodiments, the filtration system 202a-5 can be formed of fibers, which can be randomly arranged. As known to those of skill in the art, the characteristics of the fibers can vary based on the intended purpose of the PM sensor 202. In one illustrative example, the fibers of the filter 202a-5 can be composed of fiberglass, have a diameter of between approximately 0.5 and approximately 20 µm, and/or have an air space between one another that is greater than approximately 0.3 µm.

Figure 9A:
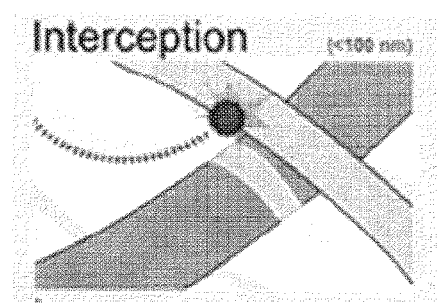
FIG. 9A is a diagram illustrating one exemplary embodiment of capturing particles using the filtration system of FIG. 8 by intercepting the particles.
Figure 9B:
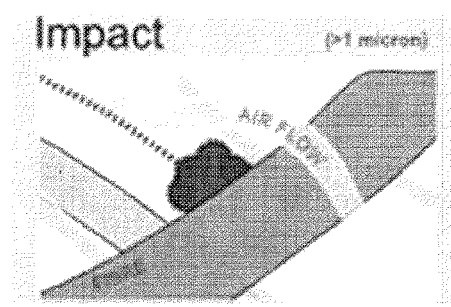
FIG. 9B is a diagram illustrating one exemplary embodiment of capturing particles using the filtration system of FIG. 8, due to particle impact.
Figure 9C:
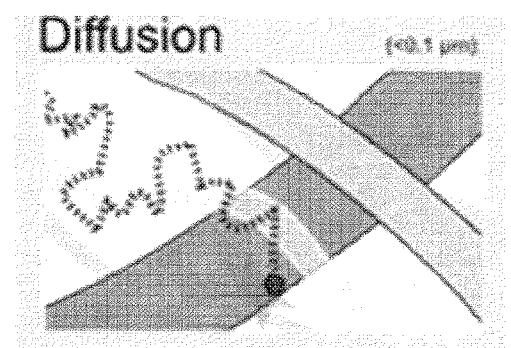
FIG. 9C is a diagram illustrating one exemplary embodiment of capturing particles using the filtration system of FIG. 8, due to particle diffusion.

The filtration system 202a-5 can be used for mechanical filtration, such as in combination with an air pump or intake system, or for electrical filtration, such as in combination with electrostatic precipitation components described herein. FIGS. 9A, 9B and 9C illustrate various manners in which particles are or can be trapped or captured by the filtration system 202a-5, namely by interception, impact and diffusion, respectively. Interception refers to the use of an attractive force such as electrostatic or van der Waals force between the particle and filter, thereby attracting the particles to the surface of the filter. Impact based capture refers to the impact (e.g., direct impact) of a particle on a filter surface. Diffusion-based capture refers to the random motion of particles that, in combination with air flow, results in their capture on the filter surface. In mechanical filtration, particles can be trapped through one or more of interception, impact and diffusion. The particles that are captured by the fibers of the filter (e.g., the substrate) can then be further measured or analyzed to obtain information about the particles. In some embodiments, a filtration system can be used together with electrostatic precipitation, for instance, to provide enhanced capturing of the particles. For example, as described above, the particles in the air can be charged with a charge opposite to that of a substrate that is or can include the filter and/or fibers.

In some embodiments, tape or a similar object can be used as the substrate 202a-1 of the particle capture subsystem on which particles are captured. The tape can be provided on a roll or strip, and can be operated by rollers. The tape can therefore be mechanically advanced at desired time periods to expose another section of tape from the roll or strip of tape on which particles can be captured, which is clean and/or particle-free. In some embodiments, the tape can be formed of conductive material, such that the charge can be transmitted thereto to provide electrostatic precipitation as described above in connection with FIGS. 6 and 7, and thereby attract oppositely charged particles. In some embodiments, the tape can be made of fibers resembling or configured in a manner resembling the filtration system, such that, like in the filtration system described above in connection with FIGS. 8, and 9A-9C, particles can be intercepted or captured for sensing. In some embodiments, non-conductive tape can be provided as or on the surface of a substrate. The use of tape as a means to provide replenishment capabilities is described in further detail below in connection with the replenishment subsystem 202c.

In some embodiments, the substrate on which particles are captured can be modified or altered to enhance the adhesion or capture of the particles on thereon. For example, the substrate can include an adhesive layer (e.g., a layer of adhesive glue) or a molecular layer. In some embodiments, glass substrates may be modified using silane chemistry to make the surface of the substrate hydrophilic, hydrophobic, oleophilic, oleophobic, and the like. Other substrates can be textured at the microscale or nanoscale to facilitate cleaning, or to otherwise enhance the function of the device.

Still with reference to the monitoring process of FIG. 5, in some embodiments, the PM sensor 202 can include hardware and/or software (e.g., embedded therein or provided by one or more communicatively coupled systems or devices) for providing dynamic monitoring and adjustments. That is, in some embodiments, such dynamic monitoring and adjustments can be identified, triggered and/or performed by one or a combination of embedded or communicatively coupled hardware and/or software of (1) the PM sensor 202, (2) the subsystems of the sensor 202, and (3) systems and devices in communication with the PM sensor 202, such as the cloud 105 and/or the management system 107. For example, in FIG. 5, once air has been collected and particles captured at step 450, a determination can made as to whether dynamic adjustments are or have been triggered by a requirement or desire, at step 452. It should be understood that such a determination can be performed by one or more of the PM sensor 202, its subsystems, and/or devices and/or systems communicatively coupled thereto. While the dynamic monitoring and determination of step 452 (and the possible execution of corresponding adjustments of step 454) is illustrated as following the particle capture of step 450, it should be understood that such determination and execution steps relating to dynamic monitoring can be performed: at various points throughout the activity illustrated in FIG. 5 and/or concurrently with other processes, as deemed optimal or appropriate for the particular PM sensor 202. That is, such dynamic processing can be performed using a feedback loop of, for example, collecting air and/or capturing particles (step 450), determining whether dynamic adjustments are or have been triggered by a requirement or desire, (step 452), and performing the necessary adjustments (step 454) iteratively until it is determined at step 452 that no more adjustments are or have been triggered in connection with that iteration.

As shown in FIG. 5, in some embodiments, at step 452, the PM sensor 202 can determine whether dynamic adjustments have been triggered (e.g., are required or desired). Such dynamic adjustments can relate to any aspect of the PM sensor 202, its subsystems, and/or its/their functionality. The determination can be made, for example, based on models, rules and/or thresholds that can be (1) prestored or predetermined, and/or (2) identified in real time, automatically and/or in conjunction with user-input data. One non-limiting and illustrative example of a dynamic check performed in connection with the dynamic determination of step 452 is whether the flow of air (e.g. the volume of air) being collected or driven by the capture subsystem 202a needs to or should be adjusted. This can be the case, for example, if it is determined that the amount or volume of air being collected at step 450 is too small or large to capture or trap the desired amount of particulate matter for analysis. Moreover, in some embodiments, such adjustments or modulating the volume of air sampled can be performed to tailor the sensitivity and/or sensor dynamic range of the PM sensor 202 for low to high pollution levels. It should be understood that a variety of reasons can exist for why the amount or volume of air being collected should be adjusted. Such a determination can be made after a given amount of air has been collected and/or a given amount of collection time has transpired, and/or can be made in real-time during the air collection and particle capturing step.

Still with reference to step 452 of FIG. 5, the volume of the collected air can be measured and that value can be compared to a threshold number or range, for example, as the air is being collected. A corresponding rule can be applied based on that comparison to determine whether an air flow increase or decrease is required or desired (YES branch from step 452), or whether such the air flow is within an allowable threshold such that no air flow adjustments are required or desired (NO branch from step 452). If a dynamic adjustment such as air flow change is deemed, at step 452, to be required or desired, such an adjustment (or adjustments) can be executed at step 454. The type of adjustment can be based on thresholds, rules and/or models. It should be understood that adjustments can be performed using a series of sub-steps or sub-adjustments, in which incremental adjustments are made until the desired or target thresholds or rules are achieved. For instance, if it is determined that air flow must be increased, then the capture subsystem 202*a* is adjusted as desired or deemed optimal (e.g., at once or incrementally) to compensate for the air volume deficiency. In the context of increasing the air flow, the power or settings of the pump, for example, can be increased to inject more air into the PM sensor 202. In some embodiments in which electrostatic precipitation is used by the capture subsystem 202*a*, the amount of charge to the electrode, and thus transmitted to the particles, can be increased. It should be understood that these and other types of dynamic adjustments described herein and known to those of skill in the art can be determined to be triggered (e.g., needed, desired) and executed at steps 452 and 454, respectively, as well as throughout the PM monitoring process. Moreover, such determinations and adjustments can be performed in a variety of ways known to those of skill in the art.

In turn, as illustrated in FIG. 5, at fork node N1, the PM sensor 202 can make a determination, at step 456, as to whether air collection or particle capture thresholds have been met (edge E1 from fork node N1), and/or perform new or continued air collection and particle capturing at step 450 (edge E2 from fork node N1). That is, at step 456, the PM sensor 202 and/or the particle capture subsystem 202*a* can determine, for example, whether a threshold or given amount or volume of air has been collected and particles removed therefrom, whether a threshold amount of time of collecting air and capturing particles has been reached, and/or whether a threshold or given amount of particles have been captured. For example, the PM sensor 202 and/or the capture subsystem 202*a* can be programmed such that sensing is performed after approximately every five minutes or approximately one hour of particle capturing, for instance. That is, the PM sensor 202 and/or the capture subsystem 202*a* can be operated in a continuous or discrete sampling cumulative mode in which particles continue to accumulate on the surface, above previously collected particles, but nonetheless can provide information about air pollution or particulate matter levels. It should be understood that any such rules and thresholds, such as those pertaining to schedules for air collection, particle capturing, and particle sensing, can be applied or used to initiate sensing, as known to those of skill in the art.

In some embodiments, if it is determined at step 456 that relevant thresholds such as air collection or particle capture thresholds have been met, the PM sensor 202 performs a sensing process at step 458 (YES branch from step 456). Otherwise, if it is determined at step 456 that thresholds have not been met, the PM sensor 202 continues to collect air and capture particles (NO branch from step 456 and E2 edge) at step 450. Such an iteration can continue to be performed until, for example, thresholds have been met that trigger sensing operations to be performed on the captured particles (e.g., approximately one hour of particle capturing time has transpired). As described herein, sensing of the captured particles performed at step 458 can be executed by the sensing subsystem 202*b* of the PM sensor 202, which is now described in further detail.

Sensing Subsystem

As described above, the sensing subsystem 202*b* is made up of one or more hardware and/or software components configured to measure and/or detect information about the particles captured at step 450. For example, the sensing subsystem can include a sensor or an array of sensors or sensor elements having the same or different sensing capabilities. Non-limiting, illustrative examples of types of sensing that can be provided by the sensor or array of sensors of the sensing subsystem 202*b* can include optical sensing, acoustic sensing, electromagnetic sensing, dielectric sensing, and others known to those of skill in the art. The number and types of sensors and other components included in or forming the sensing subsystem 202*b* can depend on the type of information about the particles that is sought to be acquired by the type and purpose of the PM sensor 202. Non-limiting examples of sensors of the sensing subsystem 202*b* can include capacitive sensors, magnetic sensors, superconducting quantum interference device (SQUID) sensors, piezoelectric sensors, and the like. In some embodiments, multiple sensing modalities can be used by the sensing subsystem 202*b* to obtain additional information about the captured particles. Moreover, the sensor may comprise an array of sensing elements, such that captured particles can be sensed by one or more sensing elements. Sensing elements can function differently for different particles captured on a substrate. Thus, in imaging by a camera, light scattered by different particles can impinge upon different groups of sensing elements (e.g., pixels) of the camera.

As described herein, the sensing subsystem 202*b* for imaging can include various types of detectors (e.g., complementary metal-oxide-semiconductor (CMOS), charge coupled device (CCD), capacitive sensor, and others described herein and known to those of skill in the art), various types of illumination sources (e.g., light emitting diode, (LED), glancing illumination, wave guiding through substrate), and/or various types of intervening optical systems (e.g., direct detection, use of lens), as known to those of skill in the art.

In some embodiments, the PM sensor 202 can be designed as an imaging-based system, in which the sensing subsystem 202*b* includes a camera. The sensing system 202*b* can also include an illumination source, which can be used to illuminate or direct light towards the captured particles. The illumination of the particles causes light to be scattered by the particles and, in turn, to be detected by the sensor of the subsystem 202*b*. In some embodiments, the detection of scattered light can be achieved by the imaging sensor due to the scattered light having the highest potential relative to other detected lights (e.g., light reflected by the substrate). As known to those of skill in the art, different particles can scatter light in different and/or unique ways. As a result, the characteristics of the scattered light (e.g., pattern, intensity) contributes to the detection and/or imaging of the particles. In some embodiments, the sensor of the subsystem 202*b* can be configured such that the smallest particles detected by scattered light may be in the range of tens of nanometers, though of course sensors can be adapted to capture particles of a range of sizes as deemed optimal for the purpose of the PM sensor. The size of such particles, for example and among other things, may be inferred from the intensity of scattered light. Thus, in such cases, particles above a few hundred nanometers may be resolved. The largest particles sensed may be, in some illustrative examples, in the range of hundreds of micrometers or more. It should be understood that, in some embodiments, particle counts may be obtained by suitable calibration procedures.

FIG. 10A illustrates an exemplary configuration of aspects of the PM sensor 202, which can be used with electrostatic precipitation type capturing subsystems. In FIG. 10, the sensing subsystem 202b includes a sensor 202b-1 and an illumination source 202b-2 (also referred to interchangeably as "light source") for optical sensing of the captured particles. The sensor 202b-1 can be a camera or the like, as known to those of skill in the art, that is configured to image the captured particles. In some embodiments, the camera can be part of a complementary metal-oxide-semiconductor (CMOS) camera module. Moreover, the illumination source 202b-2 can be an ultraviolet (UV) (e.g., near-UV) light source or a light-emitting diode (LED) light (e.g., visible-light LED), or the like, as known to those of skill in the art. As described in further detail below, the illuminating source 202b-2 and the camera 202b-1 can be positioned relative to one another, and/or to the substrate and captured particles, based on, among other things, the light transmission characteristics of the substrate, such that optimal imaging of the particles can be achieved.

Still with reference to step 458 of FIG. 5, the sensing operation of imaging the captured particles can be performed as shown in FIG. 10A. That is, as illustrated in FIG. 10A, particles P1, P2 and P3 are captured on the substrate 202a-1, in accordance with step 450 of FIG. 5, for example. Upon triggering the sensing process of step 458, the illumination source 202b-2 of the sensing subsystem 202b causes light to be directed toward the captured particles and substrate 202a-1. It should be understood that the illumination source 202b-2 of the subsystem 202b of FIG. 10A is positioned or configured such that the captured particles scatter the incident light of the illumination source 202b-2 in a manner that enables the sensor 202b-1 to detect the scattered light and thereby image the particles. In some embodiments, this illumination can be achieved by an illumination source 202b-2 that produces glancing light (e.g., at a glancing angle) relative to the substrate 202a-1 and/or the captured particles, or such that the light from the illumination source 202b-2 hits the captured particles and/or substrate 202a-1 at an acute angle. Such positioning of the illumination source relative to the particles and/or substrate can avoid or reduce light being reflected by the substrate, which can increase the sensitivity of the light scattered by the captured particles.

Figure 10B:
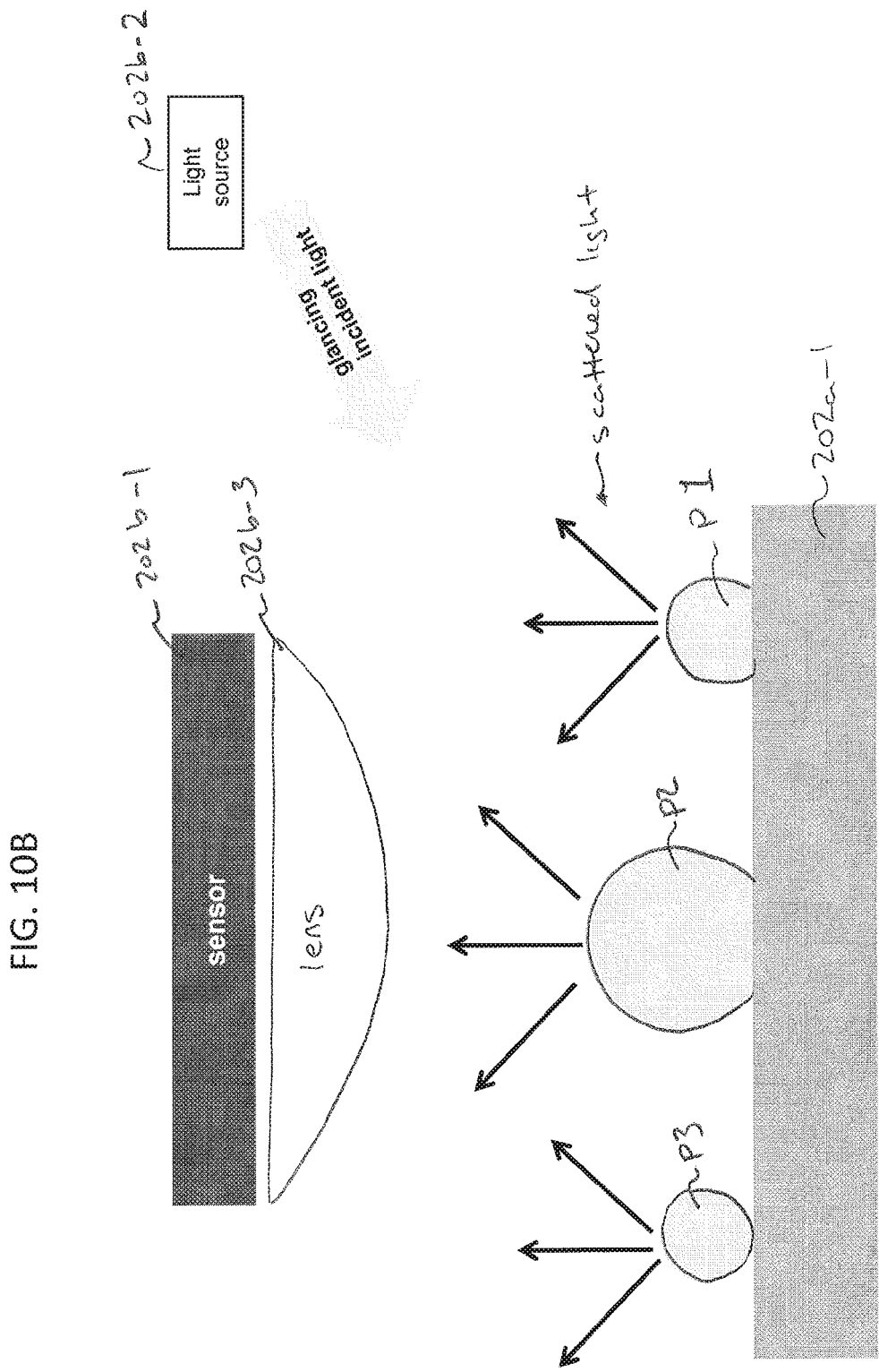
FIG. 10B is a diagram illustrating one exemplary embodiment of sensing features, including a lens, of the PM sensor of FIG. 2.

As described herein, a sensing subsystem can include an intervening lens 202b-3 disposed between the captured particles and the chip or sensor of the subsystem. FIG. 10B illustrates an exemplary configuration of aspects of the PM sensor 202, substantially similar to those show in FIG. 10A, but including a lens positioned between the sensor 202b-1 and the captured particles. The lens or lens system can be used to create an image based on the light scattered from or by the captured particles, in a similar manner as the operation of a traditional camera or microscope having different magnifying powers.

Figure 11B:
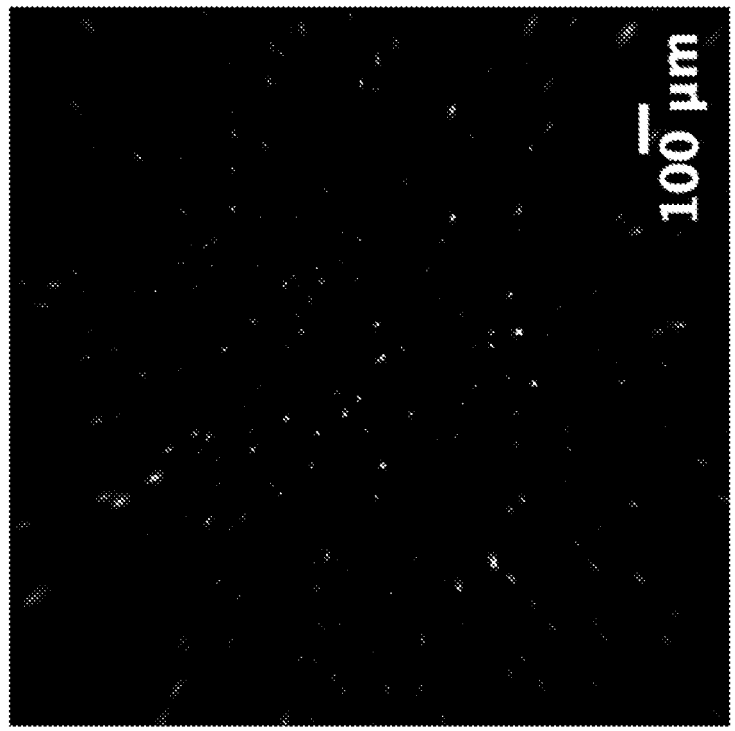
FIG. 11B is one exemplary embodiment of an image of particles captured on a copper substrate with an illumination source directed at a glancing angle
Figure 11A:
FIG. 11A is one exemplary embodiment of an image of particles captured on a copper substrate with an illumination source directed at a non-glancing angle.

FIGS. 11A and 11B illustrate the effect of the illumination angle on the imaging of the particles. That is, FIG. 11A is an image taken by a camera sensor of particles captured on a copper substrate, with an illumination source illuminating the substrate at an angle of approximately 45 degrees. FIG. 11B is an image taken by the camera sensor of the particles of FIG. 11A collected on the copper substrate, but illuminated at an angle of approximately two degrees. As can be seen, the illuminating angle of FIG. 11A causes light from the copper substrate to be reflected back to the camera sensor, whereas the illuminating angle of FIG. 11B causes the captured particles to scatter the light in a manner that is detectable by the camera sensor. FIGS. 11C, 11D and 11E are images of different exemplary particles imaged according to the sensing tools and techniques described herein. FIG. 11C is an image of tree/shrub pollens from Populus tremuloides (aspen); FIG. 11D is an image of weed pollens from Iva xantifolia (giant poverty); and FIG. 11E is an Arizona test powder made of silica, aluminum oxide, calcium oxide, potassium oxide, sodium oxide, iron oxide, magnesium oxide and titanium oxide. Analysis of these images is described in further detail below in connection with the analytics subsystem.

Figure 12A:
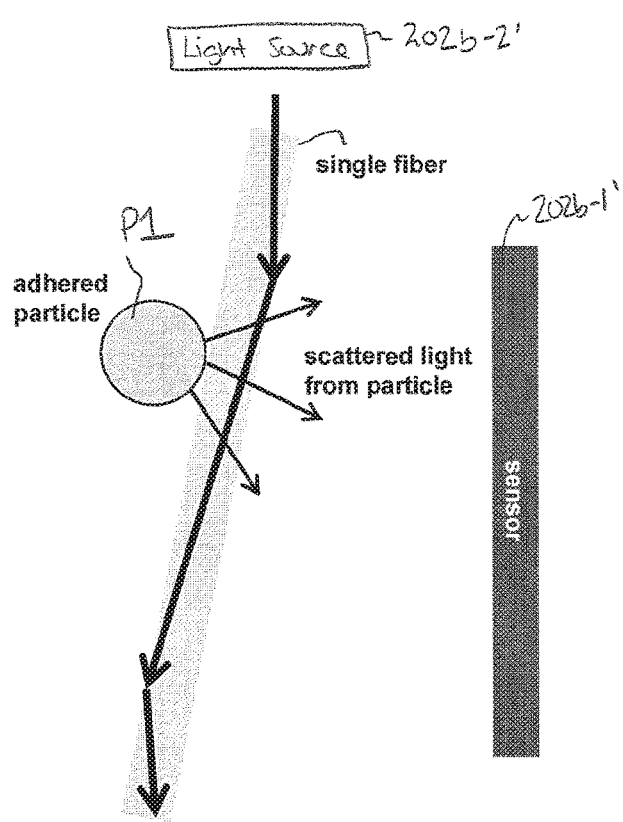
FIG. 12A is a diagram illustrating one exemplary embodiment of sensing features of the PM sensor of FIG. 2, including a single fiber of a filtration-based system.
Figure 12B:
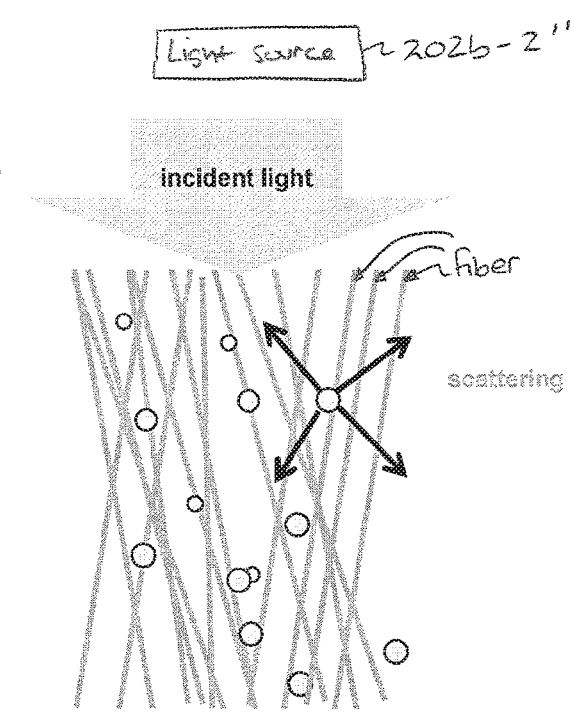
FIG. 12B is a diagram illustrating one exemplary embodiment of sensing features of the PM sensor of FIG. 2, using the filtration-based system of FIG. 12A.

FIGS. 12A and 12B illustrates an exemplary configuration of aspects of the PM sensor 202, which can be used for imaging with filtration-based particle capture subsystems. Notably, in FIG. 12A, a single fiber of a filtration-based particle capture subsystem is shown, and in FIG. 12B, a set of fibers of a filter of a filtration-based particle capture subsystem is shown. More specifically, FIG. 12A illustrates a sensor 202b-1' and a illumination source 202b-2' of a sensing subsystem. The fibers of the filter of the-filtration-based capture subsystem, such as the single fiber shown in FIG. 12A, can function as waveguides for illuminated light. The fiber can therefore guide the incident light therethrough, in a pattern such as a zig-zag pattern as shown in FIG. 12A, to reduce the amount of reflected light capable of interfering with the light scattered by the captured particles. As illustrated in FIG. 12A, the fiber can be positioned between an area where air flows through and/or proximate to the sensor 202b-1', such that the fiber can guide the incident light in a direction or from a position or angle in which the captured particle P1 scatters the light in the direction of the sensor 202b-1'. Such scattering by the captured particles can thus be detected by the sensor 202b-1'. That is, as shown in FIG. 12A, as the light (1) illuminates the substrate and is guided by and/or through the fiber (or fibers) functioning as a waveguide, in a direction away from the sensor and/or in a direction that minimizes interference with light scattered by the captured particles; and (2) illuminates particles, such as particle P1, that are adhered to or captured by the fiber, causing light to be scattered toward the sensor 202b-1', in a manner or direction that enables detection or imaging of the captured particles similar to the detection or imaging described above in connection with FIG. 10A.

In FIG. 12B, multiple fibers of the filtration-based particle capture subsystem are shown, with multiple particles captured thereon or therebetween. An illumination source 202b-2" is configured to direct light toward the multiple fibers of the filtration-based system in substantially the same manner as shown in FIG. 12A. Thus, the light from the illumination source that reaches the substrate is guided through the fibers themselves, while light that reaches the captured particles is scattered in the direction of the sensor, as shown in FIG. 12B. A corresponding sensor (not illustrated in FIG. 12B) can detect the scattered light and thereby generate, among other things, an image of the particle or particles that scattered the light. It should be understood that the type or amount of imaging or other sensing performed at step 458 of FIG. 5 can vary. For example, various types and quantities of imaging or other sensing can be performed at step 458.

As known to those of skill in the art, in some embodiments, to detect particle changes between two time periods, the data sampled at one time period can be subtracted from the data sampled at another time period. Thus, for example, in a schedule in which particle capture is continuously performed, imaging (and/or other sensing) is performed approximately hourly, and replenishment (e.g., cleaning, replacing) of the capture substrate is performed approximately every five hours, it is possible to compare the image taken approximately at hour two with the image taken approximately at hour one to detect or isolate only those particles captured between hour one and hour two.

It should be understood that the arrangement of the sensing systems described above in connection with FIGS. 10A, 10B, 12A and 12B are non-limiting examples. A person of skill in the art will understand the many ways in which sensors, illuminating sources, particle capture substrates, and other components can be configured to obtain optimal imaging or other sensing of the captured particles. Such configurations can be based on, for example, the characteristics (e.g., type, material, light transmissivity, etc.) of the sensors, illuminating sources, particle capture substrates, and other components, as well as the intended purpose or use of the PM sensor 202. In some embodiments, the illuminating source and imaging sensor can be positioned to avoid direct reflection of light from the substrate (or other than from the captured particles) to the imaging sensor, which can impact the quality of imaging of the captured particles. In some embodiments, light can be directed from a side of the substrate that is opposite to the side on which the imaging sensor is positioned, and in the direction of the imaging sensor. In such an embodiment, the substrate can be transparent and/or has light transmission properties that enable light to pass therethrough. In this way, the light that passes through, as a result of the transparent substrate, optionally in combination with the shaded or less illuminated areas caused by the non-transparent particles, can be used to image the particles or obtain other information thereabout.

The wavelength of the light from the illumination source of a sensing subsystem 202b impacts various aspects of the sensing of the particle. For example, the wavelength of the light can affect the amount of reflected light from non-particle objects (e.g., substrate) and/or the amount of or intensity of the light scattered by the particles. Thus, the wavelength of the light from the illumination source can be set or adjusted to achieve an optimal sensitivity to the particles or their scattered light, particularly relative to other lights. In some embodiments, illumination by different wavelengths (e.g., visible, UV, infrared) or spectroscopic methods (e.g., infrared, Raman spectroscopy) may be used to infer additional information about the captured particles, such as surface roughness, size, or composition.

Referring again to the monitoring process of FIG. 5, once sensing has been performed at step 458 as described above, the PM sensor 202 can: (1) determine whether dynamic adjustments are or have been triggered (edge E3 from fork node N2); (2) determine whether replenishment of the substrate or substrate surface has been triggered (edge E4 from fork node N2); and/or (3) proceed to fork node N3 (edge E5 from fork node N2), where various other processes can be performed. As described above, the three activity edges E3 to E5, and their downstream processes, can be performed sequentially or concurrently (e.g., fully or partially). Such sequential or concurrent processing likewise applies to the other processes described herein. For example, the dynamic adjustment determination of step 460 can be performed at the same time as air is collected and particles captured therefrom at step 450.

At step 460 of FIG. 5, the PM sensor 202 can determine whether dynamic adjustments are required (or desired). As discussed above in connection with step 452, the dynamic monitoring (e.g., determination of step 460, execution of step 462) can be performed by the PM sensor 202, its subsystems, or devices and systems communicatively coupled thereto. The determination of step 460 can relate to any aspect of the PM sensor 202, its subsystems, and/or its/their functionality. As also described above, the dynamic adjustment monitoring can be based on models, rules, and/or thresholds that can be (1) prestored or predetermined, or (2) identified in real time, automatically and/or in conjunction with user-input data.

In some embodiments, the dynamic check performed in connection with the determination step 460 can relate to characteristics concerning the particle sensing step 458. While, as discussed above, any type of adjustments can be monitored at step 458 (including those described above in connection with steps 452 and 454, for example), adjustments relating to particle sensing can be performed prior to, concurrently with, or subsequent to the sensing of step 458. In some embodiments, these types of sensing-related determinations are performed proximate to the sensing process of step 458, such that information derived from that sensing can be used for the determination of step 460.

Non-limiting examples of the determinations for adjustments made at step 460 include checking the appropriateness (e.g., relative to thresholds or standards) of: the timing of the imaging (or other sensing) process of step 458; the dynamic range of the imaging; the wavelength of the light from the illuminating source; the position of components such as the substrate, sensor, and/or illuminating source; and/or the need or desire to replenish the substrate or substrate surface (which can also or alternatively be performed in connection with steps 464 and 466, described in further detail below). For example, the PM sensor 202, at step 460, can determine whether wavelength of the light from the illuminating source should be altered based on a comparison of (1) the images of the particles performed at step 458, with (2) thresholds, rules and/or models that indicate optimal or preferred particle imaging characteristics (e.g., intensity). Of course, it should be understood that any of these exemplary determinations, and others described herein and known to those of skill in the art can be performed simultaneously (e.g., at step 460).

Accordingly, if the PM sensor 202 determines at step 460 that dynamic adjustments are indeed required, preferred, or otherwise desired (YES branch from step 460), the PM sensor executes or causes the execution of the necessary adjustments at step 462. On the other hand, if the PM sensor determines at step 460 that dynamic adjustments are not required, preferred, or otherwise desired (NO branch from step 460), the PM sensor proceeds to fork node N3, as shown in FIG. 5. The types of adjustments made at step 462 can be based on the determination made at step 460. In some embodiments, the determination of step 460 can involve the use of rules that can trigger particular actions or adjustments to be performed at step 462.

Non-limiting examples of dynamic adjustments made at step 462 include: changing the frequency with which particles are imaged or otherwise sensed (e.g., from approximately once per hour to four times per hour); changing the positioning (e.g., angle, distance) of the sensor, light source, substrate, and other components relative to one another; adjusting the wavelength of the light source, and others adjustments known to those of skill in the art, as needed or desired.

Still with reference to FIG. 5, at step 464, the PM sensor 202 can determine whether replenishment of the substrate and/or surface of the substrate is or has been triggered by a need or desire. In some embodiments, the determination of step 464 can be performed by the PM sensor 202 and/or its replenishment subsystem 202c, which is now described in further detail.

Replenishment Subsystem

Replenishment determination and execution can be performed by the replenishment subsystem 202c, at steps 464 and 466. As used herein, the term "replenishment" includes cleaning a substrate or substrate surface, or changing or replacing the substrate. As described above, in some embodiments, a substrate can be a conductive surface such as a copper plate, a filter, or a conductive or non-conductive tape. In some embodiments, a substrate surface can refer to a surface of the substrate on which particles are captured. Replenishment can be performed for various reasons, including to extend the period of usability of the substrate or substrate surface, or to change or reset the particles that are captured and that can therefore be imaged. Thus, at step 464, a determination can be made as to whether replenishment is needed or desired, for example, by comparing data of the PM monitoring process to predetermined or dynamically calculated thresholds. For instance, step 464 can include determining whether a given particle capturing time since a last replenishment has been reached, or whether a given amount of particulate matter has been captured on the substrate or surface since the last replenishment. These replenishment related determinations can be performed dynamically, during any step of the process 400 illustrated at FIG. 5, and based on any of a variety of data known to those of skill in the art. For example, even if a threshold is determined to be needed or desired based on factors such as timing or amount of captured particulate matter, the replenishment subsystem can determine that the battery of the PM sensor 202 is low and therefore postpone or cancel the replenishment process to extend its period of usability.

Thus, if it is determined at step 464 that replenishment is required or desired (YES branch from step 464), the replenishment subsystem 202c replenishes the surface or substrate at step 466. On the other hand, if replenishment is deemed at step 464 to not be necessary or desired (NO branch from step 464), the PM sensor 202 can proceed to fork node N3.

At step 466, replenishment is performed by the replenishment subsystem 202c. The type or other characteristics of the replenishment performed at step 466 can be predetermined or dynamically determined in real-time, for instance, based on the amount of particulate matter captured, battery life remaining, and/or scheduled processing of the PM sensor 202. Non-limiting examples of wet and dry techniques for replenishing the substrate or substrate surface include using one or more of mechanical cleaners, electrostatics cleaners, heating or thermal means, and conductive and non-conductive tapes. It should be understood that the replenishment technique used by the PM sensor 202 can be based on factors such as target cost, which can be impacted by the use of replaceable tape versus cleaning the substrate, and/or the target or desired particle removal rate (e.g., approximately >90% particle removal, approximately >95%, >99%, etc. particle removal).

Mechanical techniques for cleaning the substrate or substrate surface can include moving a mechanically operated brush over the substrate or substrate surface a given number of times and in a given pattern (e.g., circular, linear), which can be dynamically determined or predetermined. The brushing can be performed until the desired amount of particulate matter has been removed. It should be understood that the characteristics of the brush can vary and depend on the type of substrate or substrate surface. One non-limiting example is a nylon fiber brush. In some embodiments, liquid or particles can be dispersed onto the substrate or substrate surface to enhance the mechanical cleaning (e.g., brushing) thereof. Other types of mechanical techniques can include the use of air pumps, fans, air injection and ejection systems, and the like, which can be used to control the air flow such that it is strong enough to sever the attachment, attraction, or contact between the particles and the substrate or substrate surface. In some embodiments, a sticky side of an adhesive backing material (e.g., sticker, adhesive strip, adhesive tape) can be placed in contact with the surface of the substrate to clean the substrate by removing particles therefrom. A roll of such adhesive material can be provided on a roller or the like that can be advanced when needed or desire, such that a fresh adhesive material surface is available to place in contact with the substrate, to perform cleaning of the substrate when a previously used adhesive material becomes saturated with particles and can no longer be adequately used to clean. Moreover, in some embodiments, the mechanical techniques can include the use of vibration to remove or assist with the removal of captured particles. For example, the substrate vibrates or is caused to vibrate with sufficient force that causes particles captured thereon to be loosened or separated from the substrate or its surface. Thermal methods such as heating of the substrate may be used to remove particles. Such methods may be used, for example, to remove aerosol particulates by evaporation or combustion. Thermal methods may be used to change the phase of the substrate, for example, to melt and solidify the substrate and thereby replenish its surface. The particles can be removed by aid of other techniques described herein and known to those of skill in the art.

Still with reference to step 466 of the monitoring illustrated in FIG. 5, electrostatic techniques and/or cleaners for cleaning the substrate or substrate surface include applying a charge to the particles that is opposite to the charge used to capture the particles, as explained in further detail above in connection with steps 556 and 558 of FIG. 6. That is, if positively charged particles are captured on a negatively charged substrate, cleaning of the substrate can be performed by generating and applying a negative charge to the particles, which causes the particles to separate from the substrate and be removed by the flowing air and/or an air pump. In some embodiments, the air flow can be controlled (e.g., using a pump), based on dynamically determined or predetermined rules, to accomplish an optimal amount that can cause a the desired percentage of particles to be separated or removed from the substrate or surface. Moreover, in some embodiments, vibration techniques as described above can also or alternatively be used with the electrostatic removal technique. In some embodiments, a dynamically determined or predetermined amount of vibration can be applied to or trigger upon the substrate or PM sensor, which can enhance the removal of the reverse charged particles.

Figure 13A:
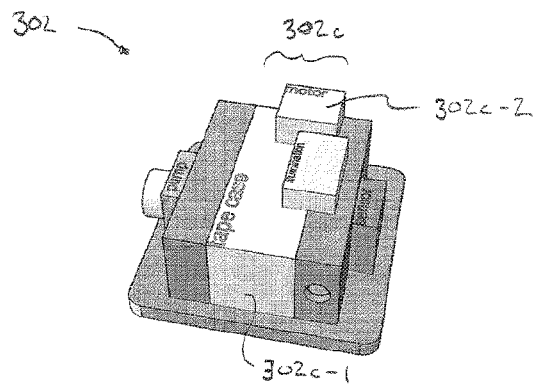
FIG. 13A is a schematic, perspective view of the PM sensor of FIG. 4 fully assembled.
Figure 13B:
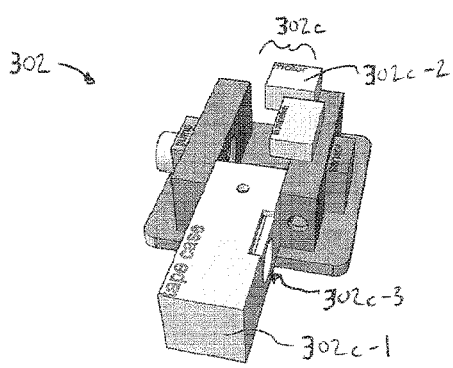
FIG. 13B is a schematic, perspective view of the PM sensor of FIG. 13A, partially assembled or partially disassembled.
Figure 13C:
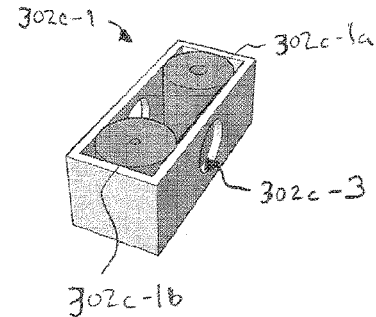
FIG. 13C is a schematic, perspective view of the tape case of the PM sensor of FIGS. 13A and 13B.

In some embodiments, tape can be used at step 466 to replenish the substrate or surface of the substrate. As described herein, conductive tape can be provided to function as the conductive surface to which electrically charged particles can adhere. As illustrated in FIGS. 13A, 13B and 13C, and described in connection with those figures, exemplary PM sensor 302 can include a replenishment subsystem 302c that includes a tape case 302c-1. More specifically, FIG. 13A is a perspective view of the assembled PM sensor 302 with the tape case 302c-1; FIG. 13B is a perspective view of the partially assembled or partially disassembled PM sensor 302, with the tape case 302c-1 partially inserted or removed, respectively; and FIG. 13C is a perspective view of the tape case c-1 separated from the rest of the PM sensor 302. The tape case 302c-1 can be separated from the PM sensor 302, for example, to add, replace, or remove tape, or to address any other issues (e.g., tangled tape) therein.

As shown in FIGS. 13A and 13B, the replenishment subsystem 302c can also include a motor, which can be used to activate components of the tape case 302c-1 such as its rollers 302c-1a and 302c-1b, which are shown in FIG. 13C. When tape (not illustrated in FIGS. 13A, 13B and 13C) is inserted in the tape case 302c-1, the rollers 302c-1a and 302c-1b are caused to rotate such that the part or segment of tape that is exposed at the opening 302c-3 can be replaced. This way, the segment of tape on which particles have been collected can be replaced by a segment of tape that is particle-free. In some embodiments, the physical segments of tape with captured particles can be retained for further or other testing (e.g., spectroscopic analysis), recordkeeping, or the like.

It should be understood that, replacement of tape or tape segments, as with other replenishment processes of step 466, can be performed based on factors such as timing (e.g., scheduled, intervals), amount of particulate matter collected, amount of battery available for executing processes, and the like. These factors can be considered based on predetermined rules or thresholds, or dynamically based on real-time data.

Returning to the monitoring process illustrated in FIG. 5, after the replenishment determination and/or execution has occurred, the PM sensor 202 can: (1) proceed to step 450 to perform a new or continued air collection and particle capturing process (edge E6 from fork node N3); (2) proceed to fork node N2 (edge E7 from fork node N3); or (3) perform a determination as to whether particle analysis of the captured and sensed particles is required or desired, at step 468 (edge E8 from fork node N3).

In some embodiments, the PM sensor 202 can proceed along edge E6 from fork node N3 to continue to capture particles from collected air, or to initiate a new particle capturing process. Although it can be performed concurrently with other processes, in some embodiments, continuing along edge E6 can be performed as alternative to the determination step 468, for example, when imaging of captured is being performed without the need to perform analysis of the imaged particles at that time. The images of the particles and data relating thereto can be stored for future analysis. Moreover, in some embodiments, the PM sensor 202 can proceed along edge E7 to perform the determination of step 460 or 464, for example, in cases where they were not performed and/or a need or desire to do so later arises.

The PM sensor 202 can proceed along edge E8 to perform the determination of step 468. In some embodiments, at step 468, a determination can be made as to whether analysis of particles is required or desired and, if so, such an analysis can be processed, in turn, at steps 470 and 472. The determination of step 468 and/or analysis processing of steps 470 and 472 among others, can be performed using the analytics subsystem 202d of the PM sensor 202, which is now described in further detail.

Analytics Subsystem

As described above, the analytics subsystem 202d can be made up of hardware and software embedded in the PM sensor 202 and/or provided in one or more communicatively coupled systems such as cloud 105 and management system 107. For example, the hardware can include one or more processors that are configured or programmed to execute software, logic, algorithms, instructions, or the like, which can be stored in one or more memories. In some embodiments, the hardware and software can be distributed, such that the processor executing the software is provided on or by the PM sensor 202 (and/or the analytics subsystems 202d), while the software is remotely stored (e.g., in the cloud 105) and made accessible to the PM sensor. In some embodiments, the PM sensor 202 can be wired or wirelessly coupled to a device such a mobile device that function as the analytics subsystem 202d. The mobile device or other configuration of the analytics subsystem 202d can be used to manage analytics of the captured and sensed (e.g., imaged) particles. As known to those of skill in the art, management of the analytics can be performed via inputs outputs that can, for example, be used to instruct certain analytics processes to be performed and/or certain analytics data to be output.

Returning to the monitoring process illustrated in FIG. 5, at step 468, the determination of whether analytics are required or desired can be based on predetermined rules or thresholds, dynamic monitoring, and/or instructions. The instructions can be automatically triggered or can be triggered by user input. For example, the determination of analytics can be based on a rule or schedule that indicates that analytics are processed approximately every 24 hour period. The determination can be dynamically made, in real-time, for example, if dangerous types of pollutants have been detected which can necessitate an urgent analysis of particles.

If it is determined at step 468 that particle analysis is required or desired (YES branch from step 468), an analysis process is performed at step 470. On the other hand, if it is determined at step 468 that particle analysis is not required or desired (NO branch from step 468), the process continues to step 474, where a determination is made as to whether air monitoring should continue.

At step 470, analysis of images or other data obtained during the sensing of step 458 is performed. In some embodiments, the types of analyses to be performed at step 470 can be determined based, at least in part, on the determination of step 468. For instance, if it is determined that particle analysis is necessary due to a potentially dangerous contamination being identified, the analysis of the images can be customized or tailored accordingly—e.g., to obtain data necessary to identify, contain, or otherwise handle the potentially dangerous pollutant. It should nonetheless be understood that any type and number of analysis processes can be performed at step 470, sequentially or concurrently. The types of analysis that are performed can be automatically determined (e.g., dynamically) or based on input instructions. For example, the analytics subsystem 202d can determine that the amount of captured particles is such that one type of analysis processes would be optimal, or can determine that the time since the last analysis was performed necessitates a group of analysis processes to be performed. In some embodiments, an air monitoring administrator or user can manually input instructions into the analytics subsystem 202d to indicate the desired analytics to be performed.

As known to those of skill in the art, analytics can be used to identify or calculate a number of different data relating to or based on the particles imaged at step 458. Non-limiting examples of the particle data that can be measured or calculated in the particle analysis of step 470 includes particle size, volume, shape, number, distribution (e.g., volume, size, shape), weight, surface area, surface roughness, morphology, composition, and the like, as known to those of skill in the art. Moreover, in some embodiments, at step 470, the particle data can be used to derive or identify other particle information, such as the type or source of the particle (e.g., aerosol, dust, pollen), and other characterizations (e.g., exposure dangers, etc.). For example, as shown in FIGS. 11C, 11D and 11E, sources of particles can be derived from information about the size and/or shape of the imaged particles. For example, particles of tree/shrub pollens produce hat-like structured image (FIG. 11C); particles of weed pollens produce spherical balls with a rough surface (FIG. 11D); and particles of a test powder produces solid edges (FIG. 11E). In some embodiments, such analyses are based on physical models (e.g. dependence of particle size, dielectric properties, and wavelength on scattering of light), on calibration of the sensor with particles of known size or composition, by use of machine learning using data gathered by a sensor under different known conditions, or a combination of these methods. Calibration can include or consider environmental data such as temperature or humidity. To this end, the PM sensor can include or be communicatively coupled to temperature or humidity sensors.

In some embodiments, previously recorded data can be used to infer pollution changes. For example, by subtracting an image obtained at a previous time from an image obtained at a later time, it is possible to calculate information about particles captured in between the two times, even if light from some of the captured particles are co-localized with previously captured particles. Moreover, calibration with different kinds of particles, or analysis methods including machine learning, can be used to process data gathered from the sensors.

In some embodiments, imaging and analysis of the particles may be performed at a later time, by retrieving or obtaining the capture substrate having the previously captured particles. In turn, methods such as electron microscopy, Raman spectroscopy, mass spectroscopy, atomic force microscopy, or other materials analysis techniques that may not be feasible to incorporate into the PM sensor's functionality can be applied on the retrieved capture substrate to analyze the captured particles. In such cases, information about the context of the particle capture (e.g., time, location) can be maintained, for example, to create a record of the particulate matter in the air. In the case of a tape-based capture, certain locations or sections of the tape relative to the tape roll can indicate a corresponding time of capture, thereby enabling analysis of particulate matter that was present in air at a certain time. In some embodiments, this information can be used to correlate the nature of particulate matter present in the environment with other events at a given point in time, such as an adverse health event (e.g., an allergic reaction).

In turn, the results of the analysis of step 470 are processed at step 472. Processing the results can include, for example, storing the results or triggering a subsequent action. The results can be stored for recordkeeping or subsequent processing, for example, locally or remotely (e.g., in cloud 105). In addition to or alternatively, the results of the analysis of step 470 can trigger subsequent action including, for example, its transmission to other entities or systems (e.g., government entities, regulators, building managers, public safety, etc.); the execution of further particle capturing, reading, and analyzing procedures; and/or other prevention, control, or countermeasures as deemed optimal.

In turn, at step 474, the PM sensor 202 can determine whether further air monitoring should be performed. If further air monitoring is determined not to be needed or desired (NO branch from step 474), the monitoring process ends at step 476. On the other hand, if it is determined at step 474 that further air monitoring is to be performed (YES branch from step 474), a dynamic adjustment determination akin to those described herein is performed at step 478. For example, the dynamic determination can be whether, based at least in part on the analysis of step 470, the reference images to which the images obtained at step 458 are to be altered, to obtain more accurate analytics and results. If it is determined that an adjustment has been triggered (YES branch from step 478), the appropriate adjustment is identified and made at step 480 and, in turn, the process returns to step 450, where air is collected and particles captured as described herein. If it is determined that an adjustment does not need to be made or is not desired, adjustments processing is not executed at step 480 and the process continues to step 450, where air is collected and particles captured Exemplary PM Sensor In some embodiments, a PM sensor or system includes a particle capture subsystem, a sensing subsystem and a replenishment system. The particle capture subsystem is configured to capture particles from air and onto a substrate. The particle capture subsystem can be electrostatic precipitation (ESP) based and/or filtration-based, meaning that electrostatic precipitation and/or a filtration system, respectively, are used to capture the particles from the air. In some embodiments, the PM sensor is configured to measure particulate matter counts of approximately PM 10 and PM 2.5, with sensitivity to approximately 200 nm particle size and a dynamic range of approximately 1-500 ug/m$^3$. That is, the PM sensor can be configured to sense particles of approximately 2.5 µm to 25 µm. In some embodiments, the PM sensor can be compact, measuring, for instance, less than approximately 2 cm×2 cm. In some embodiments, the PM sensor is configured to consume less than approximately 1000 mAh of battery for performing approximately 24 readings per day. On the other hand, in a high demanding case, 1000 mAh of battery enables the PM sensor to perform approximately 300 readings per day for a period of approximately 6 months.

An electrostatic precipitation based particle capture subsystem of the PM sensor can include an ion generator configured to transmit a charge to, for example, the substrate (or capture substrate) and/or an electrode such as an ion emitting brush. In one non-limiting example, the ion generator can produce a voltage of approximately 3000V, and can produce approximately 1.9 billion ions/cc. In some embodiments, the substrate can include copper, or a patterned conductive layer, or a patterned conductive film, such as indium tin oxide (ITO). For example, in some embodiments, the substrate can include approximately 99% copper and/or can measure approximately 0.2 mm in thickness. In some embodiments, the substrate can be polished with a metal polish and alumina suspension (e.g., approximately 0.05 µm), or with other methods to obtain a smooth surface that minimizes scattering light. The substrate, in some embodiments, can measure approximately 1 cm$^2$×1 cm$^2$. In some embodiments, the substrate can be or form a waveguide. The waveguide can include mechanical elements including silicon or silicon dioxide. Moreover, in some embodiments, the substrate can be flexible and can be moved relative to other components of the PM sensor or system.

Transmitting a charge via the ion emitting brush enables particles in the air to be charged and deflected in the direction of the oppositely charged substrate, where they can be captured. In some embodiments, the number of captured particles per unit area of the surface of the substrate on which the particles are captured scales proportionally to approximately the real particle concentration of the environment in which the air from which the particles flows.

In some embodiments, the capture subsystem is a filtration-based system that can include a HEPA filters or the like.

The capture subsystem can be configured to sample, in some embodiments, approximately one liter of air. In some embodiments, the filtration-based system can include a mesh or a porous sheet. In some embodiments, the filters can include one or more randomly arranged fibers (e.g., optical fibers) that can be composed of fiberglass or other materials known to those of skill in the art. In other embodiments, the cross-section of the fibers can be non-circular (e.g., ribbon-like). The fibers can be or form the substrate on which the particles are captured. In some embodiments, the fibers of the filters can have diameters measuring between approximately 0.5 and 25 μm. In some embodiments, fibers can be separated such that they have an air space therebetween measuring at least approximately 0.3 μm. The capture subsystem can be configured to have a capture efficiency of at least approximately 99.9% (or at least approximately 99%, 98%, 95%, etc.). As known to those of skill in the art, the fibers can function as or form a waveguide. In one illustrative example, the filter or filtration member can be made up of fibers (e.g., NYcon-PVA RMS702) with a diameter of approximately 24 μm.

The captured particles can subsequently be read or sensed by the sensing subsystem. It should be understood that, as described herein, the PM sensor can include multiple and/or differing capture or sensing systems. In some embodiments, the sensing subsystem is an imaging-based system that includes a camera such as a CMOS camera module or a CCD based image sensor. The camera module can also include an illumination source, an adapter board, a development board, and/or a borosilicate ball. The illumination source can be a visible LED light (e.g., white clear transparent) or a near-UV light. The illumination source is used to direct light at a glancing angle (e.g., approximately two degrees) toward the substrate. The light is then scattered by the particles, and the scattered light is in turn captured or detected by the camera (e.g., CMOS chip) and/or other sensor. In some embodiments, the incident or scattered light can be generated at different or multiple wavelengths. As known to those of skill in the art, a camera can have a pixel resolution of approximately 2.5 μm and can therefore detect particles bigger than approximately 2.5 μm. In such a case, smaller particles that cannot be detected by the camera or other sensor can be further analyzed using detailed scattering techniques known to those of skill in the art. The images of the particles obtained using the detected scattered light can be used by the PM sensor to obtain and/or calculate information about the particles. For example, based on the particle information, the PM sensor can identify the type or source of the particles (e.g., pollen, soot, etc.). As known to those of skill in the art, many other types of particle related information can be obtained or derived therefrom.

The substrate can be replenished in order to remove all or a portion of the particles captured thereon. Replenishment can be performed using a replenishment subsystem. It should be understood that replenishment of the substrate can include cleaning the substrate and/or its surface, or replacing all or a portion (e.g., surface) of the substrate. The replenishment subsystem can apply a variety of techniques described herein, including electrostatic force techniques (e.g., reverse applied charge or field) and/or mechanical force techniques (e.g., brush cleaning, vibration, heating). In some embodiments, liquids, including liquids impregnated in brushes or sponges, gels, and other soft materials may be used to clean the surface of the substrates.

It should be understood that the amount of electrostatic or mechanical force to be applied to separate or remove the substrate can depend on the resistivity of the captured cells.

In some embodiments, a brush such as a nylon fiber brush can be used to clean the surface of the substrate. In some embodiments, a brush can remove approximately 98% of the particles from the surface of the substrate in one round of cleaning. Additionally or alternatively, in some embodiments, air can be used to remove the captured particles from the substrate.

In some embodiments, the replenishment system include a tape case. The tape case can contain replaceable tape or rolls of tape. In some embodiments, a portion of a section of the tape can functions as the substrate. In turn, the tape rollers can be caused be actuated by a motor, causing the section of tape functioning as the substrate to be replaced by a new section of tape. In one illustrative embodiment, the tape case can measure approximately $25 \times 10 \times 10$ mm$_3$ and contain a length of approximately 80 cm of tape. The tape thickness can be approximately 100 μm; the reading or sensing section of tape can be approximately 0.2 cm. and can be configured to function for approximately ten readings. In some embodiments, an illustrative monitoring operation can be made up of a capture process of approximately ten seconds, an imaging process of approximately five seconds, and a cleaning process of approximately five seconds, using approximately 12 VDC. In some embodiments, the tape case can be configured to have a lifetime of approximately 5200 readings.

Computer Implementation

Figure 14:
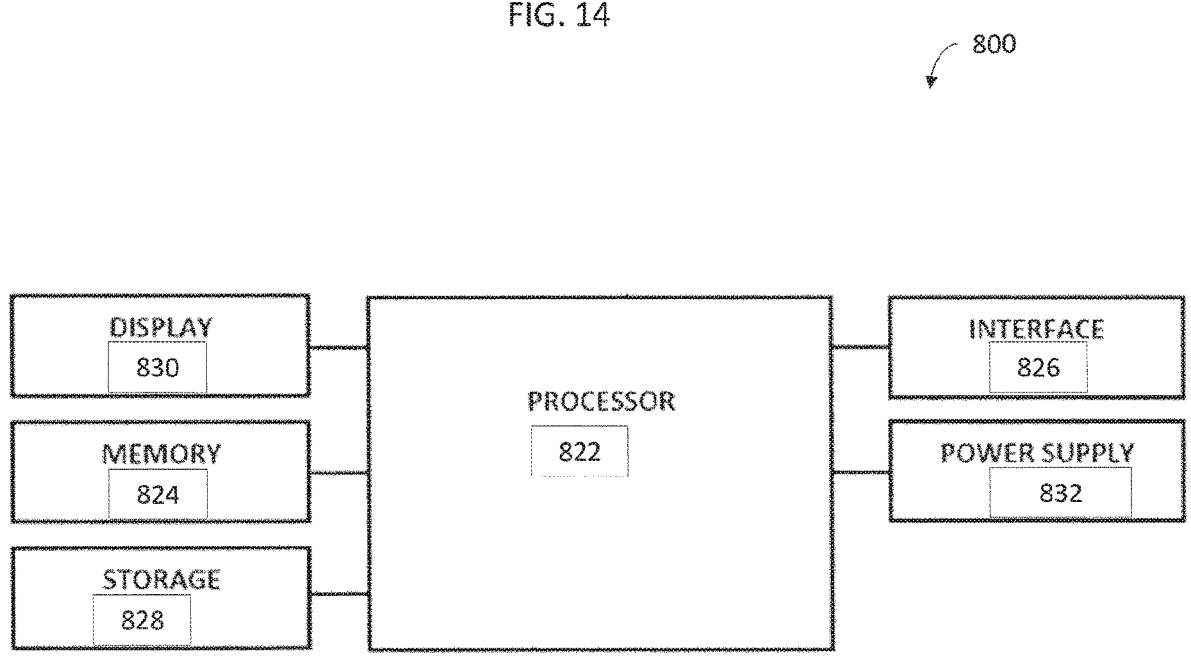
FIG. 14 is a schematic block diagram of one exemplary embodiment of a computer system for performing the air monitoring of FIG. 5.

FIG. 14 illustrates a block diagram of the physical components of an exemplary embodiment of the controller, or computer, 800 that can include an PM sensor (e.g. 202) and/or execute the PM monitoring process described herein (e.g., FIG. 5). Although an exemplary computer 800 is depicted and described herein, it will be appreciated that this is for sake of generality and convenience. In other embodiments, the computer 800 may differ in architecture and operation from that shown and described here. The computer 800 can be a tablet computer, mobile device, smart device, wearable device, smart phone, laptop computer, desktop computer, cloud-based computer, server computer, multiple of the above, and so forth.

The illustrated computer 800 can include a processor 822 that controls the operation of the computer, for example, by executing embedded software, operating systems, device drivers, application programs, and so forth. The processor 822 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 800 can include a memory 824, which can provide temporary or permanent storage for code to be executed by the processor 822 or for data that is processed by the processor. The memory 824 can include read-only memory (ROM), flash memory, one or more varieties of random access memory (RAM), and/or a combination of memory technologies. The various components of the computer 800 can be interconnected via any one or more separate traces, physical busses, communication lines, etc.

The computer 800 can include an interface 826, such as a communication interface or an I/O interface. A communication interface can enable the computer 800 to communicate with remote devices (e.g., other controllers or computer systems) over a network or communications bus (e.g., a universal serial bus). An I/O interface can facilitate communication between one or more input devices, one or more output devices, and the various other components of the computer 800. For example, the interface 826 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 800 can include a storage device 828, which can include any conventional medium for storing data in a non-volatile and/or non-transient manner. The storage device 828 can thus hold data and/or instructions in a persistent state (i.e., the value is retained despite interruption of power to the computer 800). The storage device 828 can include one or more hard disk drives, flash drives, USB drives, optical drives, various media disks or cards, and/or any combination thereof and can be directly connected to the other components of the computer 800 or remotely connected thereto, such as through the communication interface. The computer 800 can include a display 830, and can generate images to be displayed thereon. In some embodiments, the display 830 can be a vacuum fluorescent display (VFD), an organic light-emitting diode (OLED) display, or a liquid crystal display (LCD). The computer 800 can include a power supply 832 and appropriate regulating and conditioning circuitry. Exemplary power supplies include batteries, such as polymer lithium ion batteries, or adapters for coupling the computer 800 to a DC or AC power source (e.g., a USB adapter or a wall adapter).

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for monitoring particulate matter, comprising:
    capturing particles from flowing air on one or more substrates formed as a movable tape including a first part configured to capture the particles and a second part configured to capture particles and on which particles are not captured concurrently with the capturing of the particles on the first part, the capturing being performed using one or more of electrostatic and mechanical captors, and the one or more substrates being configured to function as waveguides;
    illuminating the one or more substrates using light directed through the one or more substrates as waveguides;
    executing one or more sensing operations on the captured particles, the one or more sensing operations including at least an optical sensing operation by:
        detecting scattered light scattered from the light directed through the one or more substrates by the particles captured on the one or more substrates, and
        imaging the particles captured on the one or more substrates based at least in part on the scattered light scattered by the captured particles; and
    analyzing the captured particles based on results of the one or more sensing operations,
    wherein, when the particles are captured on the substrates, the particles are in a controlled position relative to the substrates that can be maintained for a period of time sufficiently long to perform the one or more sensing operations thereon, and
    wherein the movable tape is configured to be mechanically advanced to expose different sections of the moveable tape.

2. The method of claim 1,
    wherein the one or more substrates are conductive,
    wherein, to capture the particles on the one or more substrates, the method further comprises:
        electrically charging at least one of the one or more substrates with a first charge; and
        electrically charging the particles with a second charge, the second charge being opposite the first charge, and
    wherein the electrically charging of the particles with the second charge causes the particles to deflect toward and onto the one or more substrates.

3. The method of claim 1,
    wherein the one or more substrates include a modified surface configured to enhance or control adhesion of the particles, and
    wherein the particles are captured on the one or more substrates by adhering to the modified surface of the one or more substrates.

4. The method of claim 1, further comprising:
    replenishing at least a portion of the one or more substrates on which the particles are captured by mechanically advancing the movable tape such that the capturing of particles is performed on a different portion of the movable tape.

5. The method of claim 2, further comprising:
    cleaning at least one surface of the one or more substrates on which the particles are captured using one or more of mechanical means and electrostatic means,
    wherein, to clean the at least one surface using electrostatic means, the method is further operable to:
        electrically charge the captured particles with a third charge equal to the first charge,
        wherein the electrical charge of the captured particles with the third charge causes the particles to separate away from the one or more substrates.

6. The method of claim 1, wherein the one or more sensing operations are performed by one or more sensors configured to perform the optical sensing operation and one or more of acoustic sensing, electromagnetic sensing, and dielectric sensing.

7. The method of claim 1,
    wherein the results of the one or more sensing operations include one or more images of the particles captured on the one or more substrates;
    wherein the analyzing of the captured particles comprises:
        identifying particle data corresponding to the particles from the images of the captured particles.

8. The method of claim 7, wherein the analyzing of the captured particles further comprises:
    calculating pollution or particulate matter information based on the particle data.

9. The method of claim 1, further comprising:
    dynamically adjusting aspects of one or more of the steps of capturing of the particles, the executing of the one or more sensing operations, and the analyzing the captured particles.

10. The method of claim 9, wherein the dynamic adjustment includes:
    (1) adjusting a volume of the air or a volumetric flow rate of the air from which the particles are captured based on at least one of the results of the one or more sensing operations or the results of the analyzing of the captured particles;

(2) adjusting a timing for performing the capturing of the particles, the executing of the one or more sensing operations, or the analyzing the captured particles based on at least one of the results of the one or more sensing operations or results of the analyzing of the captured particles; and (3) replenishing the one or more substrates or surfaces thereof by mechanically advancing the movable tape based on at least one of the results of the one or more sensing operations or the results of the analyzing of the captured particles.

11. A system for monitoring particulate matter, comprising:

a substrate operable to capture particles from flowing air thereon using one or more of electrostatic and mechanical captors, the substrate formed as a movable tape including a first part configured to capture the particles and a second part configured to capture particles and on which particles are not captured concurrently with the capturing of the particles on the first part, and the substrate being configured to function as waveguide;

a sensor operable to execute one or more sensing operations on the captured particles; and at least one processor operable to cause the sensor to execute the one or more sensing operations on the captured particles;

an illuminating source;

wherein the sensor includes a camera and the sensor is configured to execute optical sensing, wherein, to execute the optical sensing:

(1) the at least one processor is operable to cause the illuminating source to illuminate the substrate by directing light through the substrate as a waveguide; and (2) the sensor detects scattered light scattered by the particles captured on the substrate, wherein the substrate, the sensor and the at least one processor are communicatively coupled, wherein, when the particles are captured on the substrate, the particles are in a controlled positioned relative to the substrate that can be maintained for a period of time sufficiently long to perform the one or more sensing operations thereon, and wherein the movable tape is configured to be mechanically advanced to expose different sections of the moveable tape.

12. The system of claim 11,
wherein the substrate includes a conductive material, and
wherein, to capture the particles on the substrate, the at least one processor is operable to:
electrically charge the substrate with a first charge; and
electrically charge the particles in the air with a second charge, the second charge being opposite the first charge,
wherein the electrically charging of the particles with the second charge causes the particles to deflect toward and onto the substrate.

13. The system of claim 11, further comprising:
an air pump operable to increase or decrease flow of air,
wherein the substrate includes filters, and
wherein, to capture the particles on the substrate, the at least one processor is operable to:
cause the air pump to increase or decrease the flow of air containing the particles through or over the filters of the substrate, thereby causing the particles in the air to be captured by one or more of the filters.

14. The system of claim 11,
wherein the substrate includes a modified surface configured to enhance or control adhesion of the particles, and
wherein the particles are captured on the substrate by adhering to the modified surface of the substrate.

15. The system of claim 12,
wherein the at least one processor is further operable to cause at least one surface of the substrate on which the particles are captured to be cleaned using one or more of mechanical means and electrostatic means, and
wherein to clean the at least one surface of the substrate using electrostatic means, the at least one processor is operable to:
electrically charge the captured particles with a third charge equal to the first charge,
wherein the electrically charging of the captured particles with the third charge causes the particles to separate away from the substrate.

16. The system of claim 11, wherein the sensor is further operable to image the captured particles based at least in part on the scattered light scattered by the captured particles.

17. The system of claim 16, wherein the scattered light is scattered with multiple wavelengths of light.

18. The method of claim 1, wherein the movable tape comprises a filter.

19. The method of claim 7, wherein the one or more images of the particles captured on the one or more substrates are based at least in part on scattered light scattered by the captured particles with multiple wavelengths of light.

* * * * *